(12) United States Patent
Fujita et al.

(10) Patent No.: US 9,875,571 B2
(45) Date of Patent: Jan. 23, 2018

(54) IMAGE COMBINING APPARATUS, TERMINAL DEVICE, AND IMAGE COMBINING SYSTEM INCLUDING THE IMAGE COMBINING APPARATUS AND TERMINAL DEVICE

(71) Applicants: Yohei Fujita, Kanagawa (JP); Takeshi Fujita, Tokyo (JP); Tetsuro Kutsuwada, Kanagawa (JP); Akira Masuda, Tokyo (JP); Kohichi Nishide, Tokyo (JP)

(72) Inventors: Yohei Fujita, Kanagawa (JP); Takeshi Fujita, Tokyo (JP); Tetsuro Kutsuwada, Kanagawa (JP); Akira Masuda, Tokyo (JP); Kohichi Nishide, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 175 days.

(21) Appl. No.: 13/724,158

(22) Filed: Dec. 21, 2012

(65) Prior Publication Data

US 2013/0162671 A1  Jun. 27, 2013

(30) Foreign Application Priority Data

Dec. 27, 2011 (JP) .................................. 2011-286230

(51) Int. Cl.
*G09G 5/00* (2006.01)
*G06T 15/20* (2011.01)
(Continued)

(52) U.S. Cl.
CPC .............. *G06T 15/20* (2013.01); *G06F 1/169* (2013.01); *G06F 3/0383* (2013.01); *G06F 3/041* (2013.01);
(Continued)

(58) Field of Classification Search
USPC ......................................................... 345/629
See application file for complete search history.

(56) References Cited

U.S. PATENT DOCUMENTS 5,027,198 A * 6/1991 Yoshioka ................... 348/14.08
5,583,980 A * 12/1996 Anderson ...................... 345/473
(Continued)

FOREIGN PATENT DOCUMENTS

JP 58-086588 5/1983
JP 05-168007 7/1993
(Continued)

OTHER PUBLICATIONS

Office Action for Corresponding Japanese Application No. 2011-286230 dated Oct. 27, 2015.

*Primary Examiner* — M Good Johnson
(74) *Attorney, Agent, or Firm* — Harness, Dickey & Pierce, P.L.C.

(57) ABSTRACT

In an embodiment, provided is an image combining apparatus coupled to a first terminal device through a network. The image combining apparatus includes: a delivery section that delivers screen data that is image data for a screen to the first terminal device; a receiving section that receives first handwriting position information indicating a position of first handwriting information input to a screen based on the screen data on the first terminal device; a generation section that produces first handwriting image data that is the image data of the first handwriting information using the first handwriting position information; and a combining section that produces combined screen data by combining the screen data with the first handwriting image data.

21 Claims, 23 Drawing Sheets

(51) Int. Cl.
*G09G 5/377* (2006.01)
*G06F 1/16* (2006.01)
*G06F 3/038* (2013.01)
*G06F 3/041* (2006.01)
*G06F 3/0488* (2013.01)
*G06F 3/14* (2006.01)
*G09G 5/397* (2006.01)

(52) U.S. Cl.
CPC ........ *G06F 3/04883* (2013.01); *G06F 3/1454* (2013.01); *G09G 5/377* (2013.01); *G09G 5/397* (2013.01); *G06F 2203/0383* (2013.01); *G09G 2340/12* (2013.01)

(56) References Cited

U.S. PATENT DOCUMENTS

| | | | | |
|---|---|---|---|---|
| 5,629,714 | A * | 5/1997 | Nishitani et al. | 345/2.3 |
| 5,730,602 | A * | 3/1998 | Gierhart et al. | 434/155 |
| 5,818,436 | A | 10/1998 | Imai et al. | |
| 5,818,616 | A * | 10/1998 | Kawai | 398/72 |
| 5,917,475 | A * | 6/1999 | Kuzunuki et al. | 345/173 |
| 6,084,584 | A * | 7/2000 | Nahi et al. | 715/864 |
| 6,211,863 | B1 * | 4/2001 | Chery et al. | 345/179 |
| 6,320,597 | B1 * | 11/2001 | Ieperen | 345/629 |
| 6,388,654 | B1 * | 5/2002 | Platzker | G06F 3/033 345/1.2 |
| 6,724,375 | B2 * | 4/2004 | Wu | G06F 1/1626 178/18.03 |
| 6,983,370 | B2 * | 1/2006 | Eaton et al. | 713/182 |
| 7,053,798 | B2 * | 5/2006 | Popineau | 341/20 |
| 7,129,934 | B2 * | 10/2006 | Luman et al. | 345/173 |
| 7,346,841 | B2 * | 3/2008 | Kuruoglu | G06F 17/241 358/505 |
| 7,515,599 | B2 * | 4/2009 | Chung et al. | 370/412 |
| 7,516,183 | B2 * | 4/2009 | Shiigi | G06Q 10/107 709/206 |
| 7,552,228 | B2 * | 6/2009 | Parasnis et al. | 709/231 |
| 7,692,636 | B2 * | 4/2010 | Kim et al. | 345/173 |
| 8,078,968 | B2 * | 12/2011 | Ota | 715/730 |
| 8,187,005 | B1 * | 5/2012 | Ward | 434/365 |
| 8,213,048 | B2 * | 7/2012 | Fukushima | B41J 3/445 345/156 |
| 8,656,302 | B2 * | 2/2014 | Nagano | G06F 3/1454 345/530 |
| 8,707,176 | B2 * | 4/2014 | Muto | G11B 27/105 709/204 |
| 9,086,798 | B2 * | 7/2015 | Barrus | G06F 3/04883 |
| 9,256,362 | B2 * | 2/2016 | Yamamoto | G06F 3/04855 |
| 9,449,418 | B2 * | 9/2016 | Lee | G06T 13/80 |
| 2002/0008692 | A1 * | 1/2002 | Omura | G06F 1/16 345/173 |
| 2002/0056577 | A1 * | 5/2002 | Kaye et al. | 178/18.03 |
| 2002/0118180 | A1 * | 8/2002 | Martin | 345/178 |
| 2003/0072490 | A1 * | 4/2003 | Pettersson et al. | 382/186 |
| 2003/0117532 | A1 * | 6/2003 | Karasawa et al. | 348/734 |
| 2004/0085301 | A1 * | 5/2004 | Furukawa | G06K 9/222 345/179 |
| 2004/0228531 | A1 * | 11/2004 | Fernandez et al. | 382/187 |
| 2006/0050240 | A1 * | 3/2006 | Castaldi et al. | 353/30 |
| 2009/0098893 | A1 * | 4/2009 | Huang | H04M 1/72547 455/466 |
| 2009/0309956 | A1 * | 12/2009 | Hawkins | H04M 3/56 348/14.08 |
| 2010/0031132 | A1 * | 2/2010 | Yamaji | G06F 17/211 715/203 |
| 2010/0067674 | A1 * | 3/2010 | Lee | G06F 3/03545 379/100.01 |
| 2010/0149206 | A1 * | 6/2010 | Shigehisa | G06F 3/04883 345/595 |
| 2010/0210332 | A1 * | 8/2010 | Imai | A63F 13/10 463/7 |
| 2010/0251106 | A1 * | 9/2010 | Barrus | G06F 3/04883 715/268 |
| 2011/0181619 | A1 * | 7/2011 | Kwon | H04M 1/72555 345/629 |
| 2011/0227951 | A1 | 9/2011 | Kubo et al. | |
| 2011/0230215 | A1 * | 9/2011 | Kim | 455/466 |
| 2012/0229425 | A1 * | 9/2012 | Barrus | G06F 3/04883 345/179 |
| 2013/0027404 | A1 * | 1/2013 | Sarnoff | G06T 1/20 345/441 |
| 2014/0149880 | A1 * | 5/2014 | Farouki | H04L 12/1822 715/748 |

FOREIGN PATENT DOCUMENTS

| | | |
|---|---|---|
| JP | H06343146 A | 12/1994 |
| JP | 09-097018 | 4/1997 |
| JP | 11-237866 | 8/1999 |
| JP | 2004-118236 A | 4/2004 |
| JP | 2005-079913 | 3/2005 |
| JP | 2005-092158 | 4/2005 |
| JP | 2008-245005 A | 10/2008 |
| JP | 4565232 | 8/2010 |
| JP | 2010-251919 A | 11/2010 |
| JP | 2011-199450 A | 10/2011 |

\* cited by examiner

| x COORDINATE | y COORDINATE |
|---|---|
| 30 | 25 |
| 35 | 30 |
| 40 | 25 |
| 45 | 20 |
| 30 | 55 |
| 35 | 60 |
| 40 | 55 |

| x COORDINATE | y COORDINATE |
|---|---|
| 30 | 25 |
| 35 | 30 |
| 40 | 25 |
| 45 | 20 |
| 30 | 55 |
| 35 | 60 |
| 40 | 55 |
| 45 | 50 |

| TYPE | x COORDINATE | y COORDINATE |
|---|---|---|
| 1 | 30 | 25 |
| 1 | 35 | 30 |
| 1 | 40 | 25 |
| 1 | 45 | 20 |
| 1 | 30 | 55 |
| 1 | 35 | 60 |
| 1 | 40 | 55 |
| 1 | 45 | 50 |
| 0 | 30 | 55 |
| 0 | 35 | 60 |
| 0 | 40 | 55 |
| 0 | 45 | 50 |

| INPUT TIME | x COORDINATE | y COORDINATE |
|---|---|---|
| 10:00 | 30 | 25 |
| 10:00 | 35 | 30 |
| 10:00 | 40 | 25 |
| 10:00 | 45 | 20 |
| 10:10 | 30 | 55 |
| 10:10 | 35 | 60 |
| 10:10 | 40 | 55 |
| 10:10 | 45 | 50 |

| A | | B | |
|---|---|---|---|
| x COORDINATE | y COORDINATE | x COORDINATE | y COORDINATE |
| 30 | 25 | 30 | 55 |
| 35 | 30 | 35 | 60 |
| 40 | 25 | 40 | 55 |
| 45 | 20 | 45 | 50 |

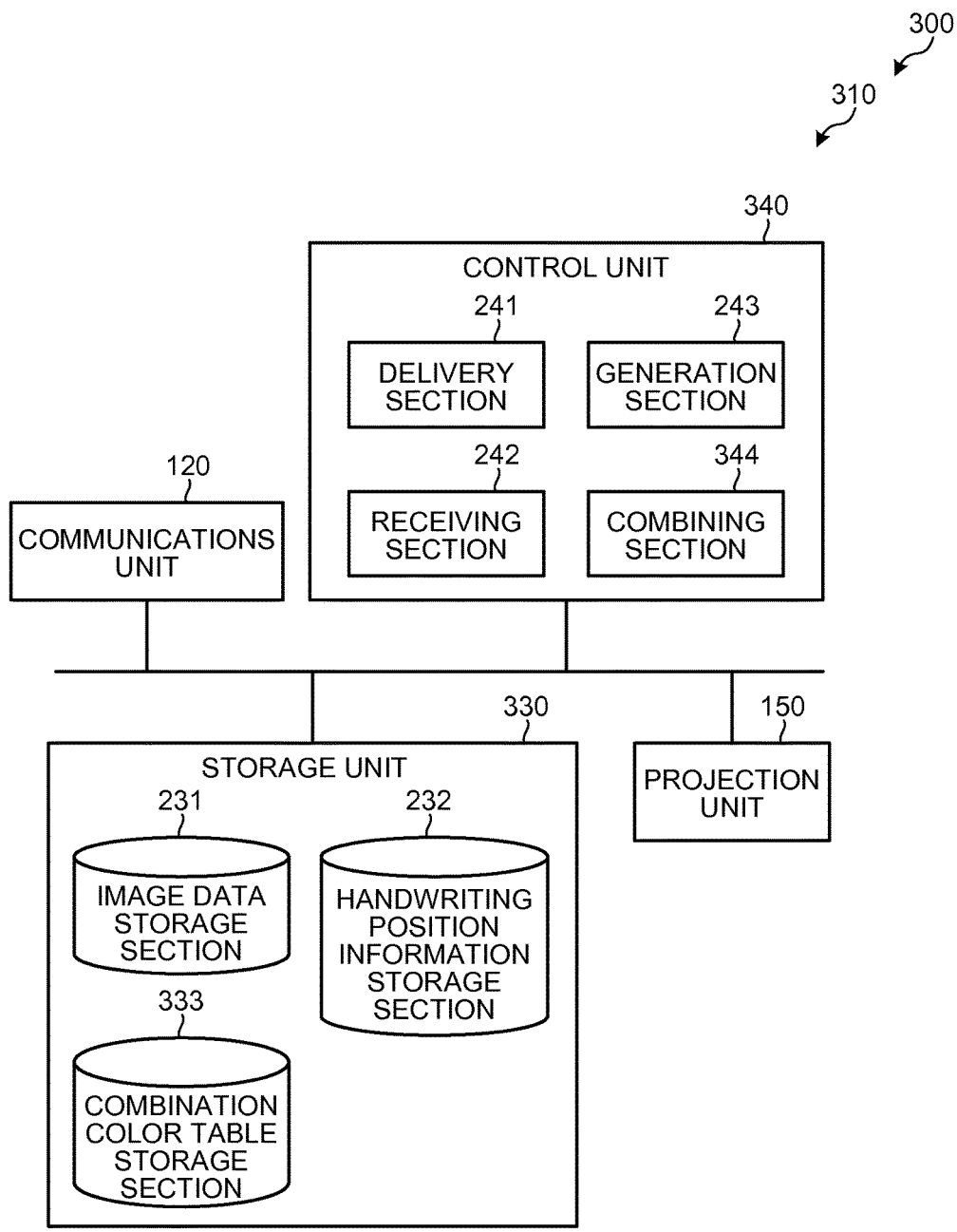

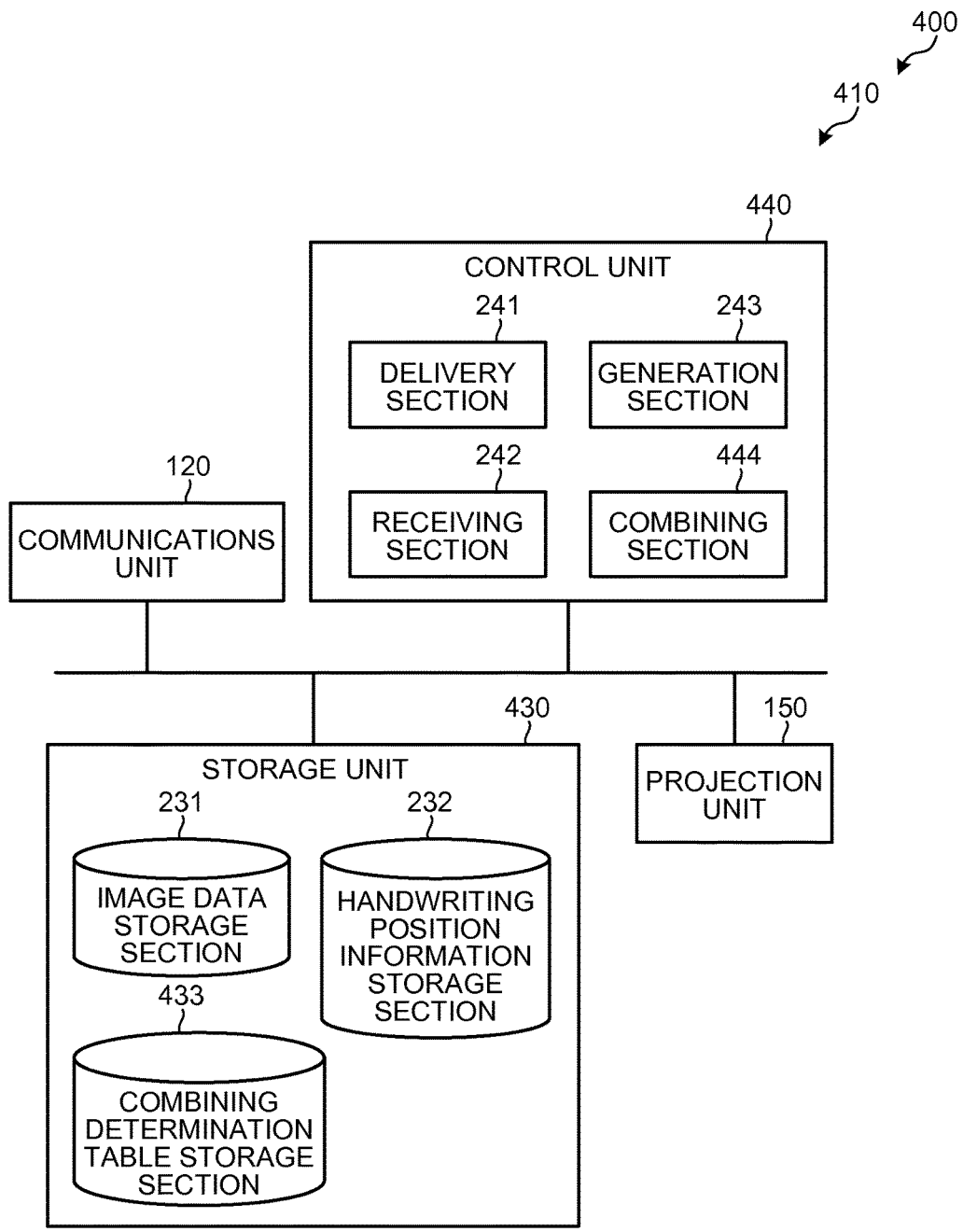

| TERMINAL IDENTIFICATION INFORMATION | SYNCHRONIZATION IMPLEMENTATION/NON-IMPLEMENTATION INFORMATION | SYNCHRONIZATION TARGET TERMINAL IDENTIFICATION INFORMATION |
|---|---|---|
| A | IMPLEMENTATION | – |
| B | NON-IMPLEMENTATION | A |

IMAGE COMBINING APPARATUS, TERMINAL DEVICE, AND IMAGE COMBINING SYSTEM INCLUDING THE IMAGE COMBINING APPARATUS AND TERMINAL DEVICE

CROSS-REFERENCE TO RELATED APPLICATIONS

The present application claims priority to and incorporates by reference the entire contents of Japanese Patent Application No. 2011-286230 filed in Japan on Dec. 27, 2011.

BACKGROUND OF THE INVENTION

1. Field of the Invention

The present invention relates to an image combining apparatus, a terminal device, and an image combining system including the image combining apparatus and the terminal device.

2. Description of the Related Art

Techniques have been known in which projectors deliver image data for projection to mobile terminals through networks; the mobile terminals input handwriting information to the delivered image data and transfer the resulting image data to the projectors through the networks; and the projectors combine the image data for projection with the image data including the handwriting information and project screens based on the combined image data.

As a similar technique, Japanese Patent Application Laid-open No. 2005-079913 discloses a technique in which image data of an image taken by a camera; image data of handwriting information input using a tablet are transmitted to an external server through a network; and the external server produces image data for display by combining the received image data.

The conventional techniques, however, have a problem of an increase in the load of the network because the image data of the handwriting information is transmitted through the network.

There is a need to provide an image combining apparatus, a terminal device, and an image combining system including the image combining apparatus and the terminal device.

SUMMARY OF THE INVENTION

It is an object of the present invention to at least partially solve the problems in the conventional technology.

According to an embodiment, provided is an image combining apparatus coupled to a first terminal device through a network. The image combining apparatus includes: a delivery section that delivers screen data that is image data for a screen to the first terminal device; a receiving section that receives first handwriting position information indicating a position of first handwriting information input to a screen based on the screen data on the first terminal device; a generation section that produces first handwriting image data that is the image data of the first handwriting information using the first handwriting position information; and a combining section that produces combined screen data by combining the screen data with the first handwriting image data.

According to another embodiment, provided is a terminal device coupled to an image combining apparatus through a network. The terminal device includes: a receiving section that receives screen data that is image data for a screen from the image combining apparatus; a display control section that causes a display unit to display a screen based on the screen data; an acquisition section that receives input of handwriting information to the screen and acquires handwriting position information indicating a position of the handwriting information; and a transmission section that transmits the handwriting position information to the image combining apparatus.

According to still another embodiment, provided is an image combining system that includes: the terminal device and the image combining apparatus mentioned above that is coupled to the terminal device through a network.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 26 is a block diagram illustrating an exemplary structure of a projector in an image combining system according to a third embodiment;

FIG. 27 is a schematic diagram illustrating an example of a combination color table stored in a combination color table storage section in the third embodiment;

FIG. 28 is a block diagram illustrating an exemplary structure of a projector in an image combining system according to a fourth embodiment;

FIG. 29 is a schematic diagram illustrating an example of a combining determination table stored in a combining determination table storage section in the fourth embodiment;

DETAILED DESCRIPTION OF THE PREFERRED EMBODIMENTS

Embodiments of an image combining apparatus, a terminal device, and an image combining system including the image combining apparatus are described in detail below with reference to the accompanying drawings. In the following embodiments, projectors and tablets are described as respective examples of the image combining apparatus and the terminal device. Examples of the image combining apparatus and the terminal device are, however, not limited to the projectors and the tablets. Any image combining apparatus that can combine images is applicable. For example, an apparatus using a computer such as a server may be applicable. Any terminal device that can receive handwriting input is applicable. For example, a smartphone may be applicable.

First Embodiment

Figure 1:
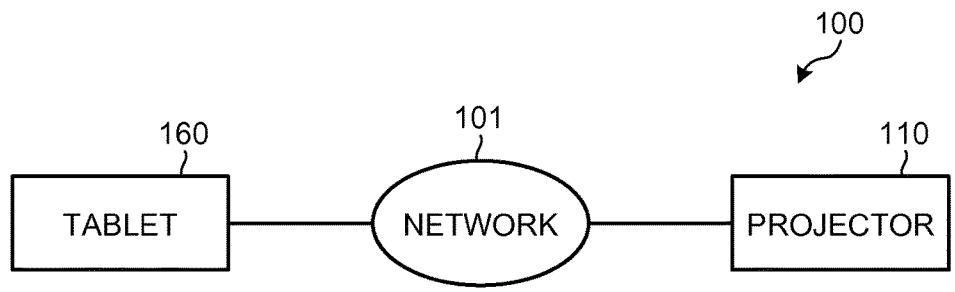
FIG. 1 is a block diagram illustrating an exemplary structure of an image combining system according to a first embodiment.

FIG. 1 is a block diagram illustrating an exemplary structure of an image combining system 100 according to a first embodiment. As illustrated in FIG. 1, the image combining system 100 includes a projector 110 and a tablet 160.

The projector 110 and the tablet 160 are coupled through a network 101. The network 101, which has at least a function to connect the projector 110 and the tablet 160 so as to enable communications therebetween, can be achieved by a communications system such as the Internet and a local area network (LAN).

The projector 110 projects a screen based on screen data that is image data for projection. The projector 110 delivers the screen data to the tablet 160 and receives, from the tablet 160, handwriting position information indicating the position of handwriting information input to an image based on the screen data. Then, the projector 110 produces handwriting image data that is the image data of the handwriting position information, produces combined screen data by combining the screen data with the handwriting image data, and projects the screen based on the combined screen data.

Figure 2:
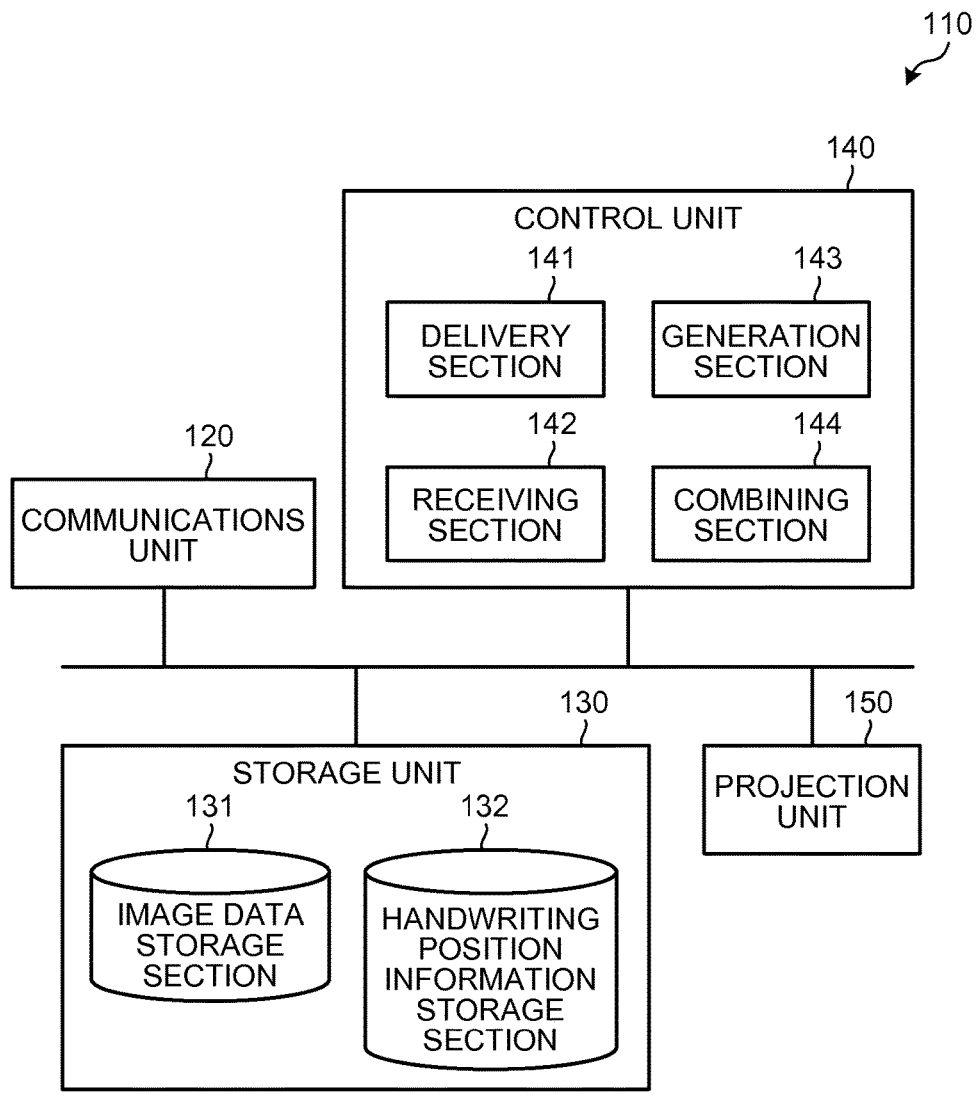
FIG. 2 is a block diagram illustrating an exemplary structure of a projector in the first embodiment.

FIG. 2 is a block diagram illustrating an exemplary structure of the projector 110 in the first embodiment. As illustrated in FIG. 2, the projector 110 includes a communications unit 120, a storage unit 130, a control unit 140, and a projection unit 150.

The communications unit 120, which communicates with the tablet 160 through the network 101, can be achieved by a communications device such as a communications interface.

The storage unit 130 stores therein various programs executed by the projector 110 and various types of data used for various types of processing performed by the projector 110. The storage unit 130 can be achieved by at least any of storage devices capable of magnetically, optically, or electrically storing therein data, such as a hard disk drive (HDD), a solid state drive (SDD), a memory card, an optical disk, a read only memory (ROM), and a random access memory (RAM).

Figures 3, 4:
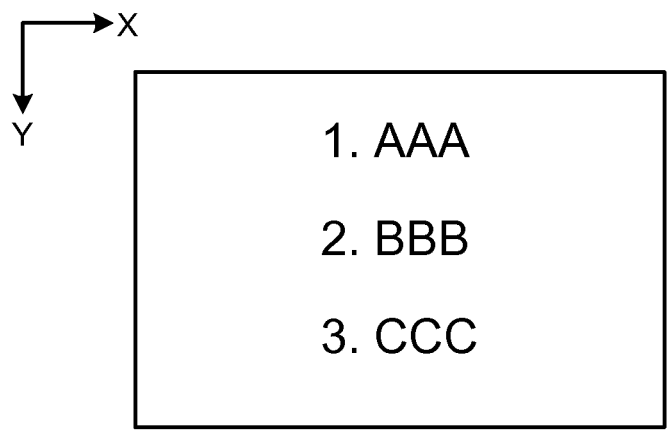
FIG. 3 is a schematic diagram illustrating an example of screen data in the first embodiment.
FIG. 4 is a schematic diagram illustrating an example of handwriting position information stored in a handwriting position information storage section in the first embodiment.

The storage unit 130 includes an image data storage section 131 and a handwriting position information storage section 132. The image data storage section 131 stores therein various types of image data such as the screen data that is the image data for a screen projected by the projection unit 150, which is described later. An example of the screen data is illustrated in FIG. 3. The handwriting position information storage section 132 stores therein the handwriting position information. The detail of the handwriting position information is described later.

The control unit 140, which controls each unit of the projector 110, can be achieved by a control device such as a central processing unit (CPU). The control unit 140 includes a delivery section 141, a receiving section 142, a generation section 143, and a combining section 144.

The delivery section 141 delivers the screen data to the tablet 160. Specifically, the delivery section 141 receives a delivery request of the screen data from the tablet 160, acquires the screen data received as the delivery request from the image data storage section 131, and delivers the acquired screen data to the tablet 160. In the first embodiment, the screen data includes an aspect ratio. The screen data is, however, not limited to the one including the aspect ratio. For example, the delivery section 141 receives a delivery request of the screen data illustrated in FIG. 3 from the tablet 160, acquires the screen data illustrated in FIG. 3 from the image data storage section 131, and delivers the acquired screen data to the tablet 160.

The receiving section 142 receives the handwriting position information indicating the position of the handwriting information input by a user to a screen based on the screen data on the tablet 160, and stores the handwriting position information in the handwriting position information storage section 132. Examples of the handwriting information include characters, symbols, and pictures drawn by handwriting. In the first embodiment, the handwriting position information indicates two-dimensional coordinates (x,y) on the screen. The handwriting position information is, however, not limited to indicating the two-dimensional coordinates (x,y). In the first embodiment, the origin (0,0) of the two-dimensional coordinates is positioned at the upper left of the screen.

Specifically, the tablet 160 transmits a pair of coordinates, which are the previous coordinates (just before input) and current coordinates (just input), to the projector 110 sequentially as the handwriting position information while the handwriting information is input (e.g., a user inputs the handwriting information by touch operation). Accordingly, the receiving section 142 sequentially receives the pair of coordinates from the tablet 160 and stores the current coordinates out of the pair of coordinates as the handwriting position information in the handwriting position information storage section 132 while the handwriting information is input to the tablet 160.

Figures 5, 6:
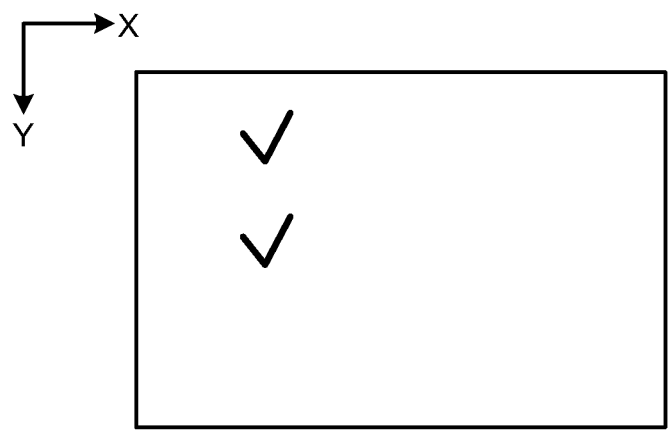
FIG. 5 is a schematic diagram illustrating an example of the handwriting position information stored in the handwriting position information storage section in the first embodiment.
FIG. 6 is a schematic diagram illustrating an example of handwriting image data in the first embodiment.

FIG. 4 is a schematic diagram illustrating an example of the handwriting position information stored in the handwriting position information storage section 132 in the first embodiment. In the example illustrated in FIG. 4, the handwriting position information (coordinates (x,y)) is arranged such that the newer the data in time series the lower the data is positioned in FIG. 4. For example, it is assumed that the receiving section 142 receives from the tablet 160 a pair of coordinates, which are the previous coordinates (40,55) and the current coordinates (45,50), as the handwriting position information. In this case, as illustrated in FIG. 5, the receiving section 142 confirms that coordinates (40, 55) at the lowest position in FIG. 4 are equal to the previous coordinates (40,55) in the pair of coordinates, and additionally stores the current coordinates (45,50) out of the pair of coordinates at the lowest position (under the coordinates (40,55) at the lowest position illustrated in FIG. 4).

In this regard, the tablet 160 may transmit the current coordinates to the projector 110 sequentially, instead of the pair of coordinates, and the projector 110 may sequentially receive the current coordinates from the tablet 160.

The generation section 143 produces the handwriting image data that is the image data of the handwriting information using the handwriting position information received by the receiving section 142. Specifically, the generation section 143 produces the handwriting image data using the handwriting position information stored in the handwriting position information storage section 132, and stores the produced handwriting image data in the image data storage section 131. The generation section 143 produces the handwriting image data illustrated in FIG. 6 by connecting the adjacent coordinates in time series using the handwriting position information illustrated in FIG. 5, for example.

The combining section 144 produces combined screen data by combining the screen data with the handwriting image data produced by the generation section 143. Specifically, the combining section 144 produces the combined screen data by combining the screen data stored in the image data storage section 131 with the handwriting image data, and stores the produced combined screen data in the image data storage section 131. In the first embodiment, the image data stored in the image data storage section 131 is managed on a layer-by-layer basis. Accordingly, the combining section 144 produces the combined screen data by overlapping a layer in which the screen data is drawn and a layer in which the handwriting image data is drawn. For example, the combining section 144 produces the combined screen data illustrated in FIG. 7 by overlapping the screen data illustrated in FIG. 3 and the handwriting image data illustrated in FIG. 6.

The projection unit 150, which projects images, can be achieved by a projection device such as a liquid crystal projector. The projection unit 150 projects the screen based on the screen data. Specifically, when receiving the screen data that is stored in the image data storage section 131 and transferred by the control unit 140, the projection unit 150 projects the screen based on the screen data. For example, when receiving the screen data illustrated in FIG. 3 that is transferred by the control unit 140 from the image data storage section 131, the projection unit 150 projects the screen based on the screen data.

The projection unit 150 also projects the screen based on the combined screen data when the combined screen data is produced by the combining section 144. Specifically, when receiving the combined screen data that is stored in the image data storage section 131 and transferred by the control unit 140, the projection unit 150 projects the screen based on the combined screen data. For example, when receiving the combined screen data illustrated in FIG. 7 that is transferred by the control unit 140 from the image data storage section 131, the projection unit 150 projects the screen based on the combined screen data.

The tablet 160 requests the projector 110 to deliver the screen data, receives the requested screen data, and displays the screen based on the received screen data. The tablet 160 receives input of the handwriting information performed by a user to the displayed screen, acquires the handwriting position information indicating the position of the received handwriting information, and transmits the acquired handwriting position information to the projector 110.

Figure 8:
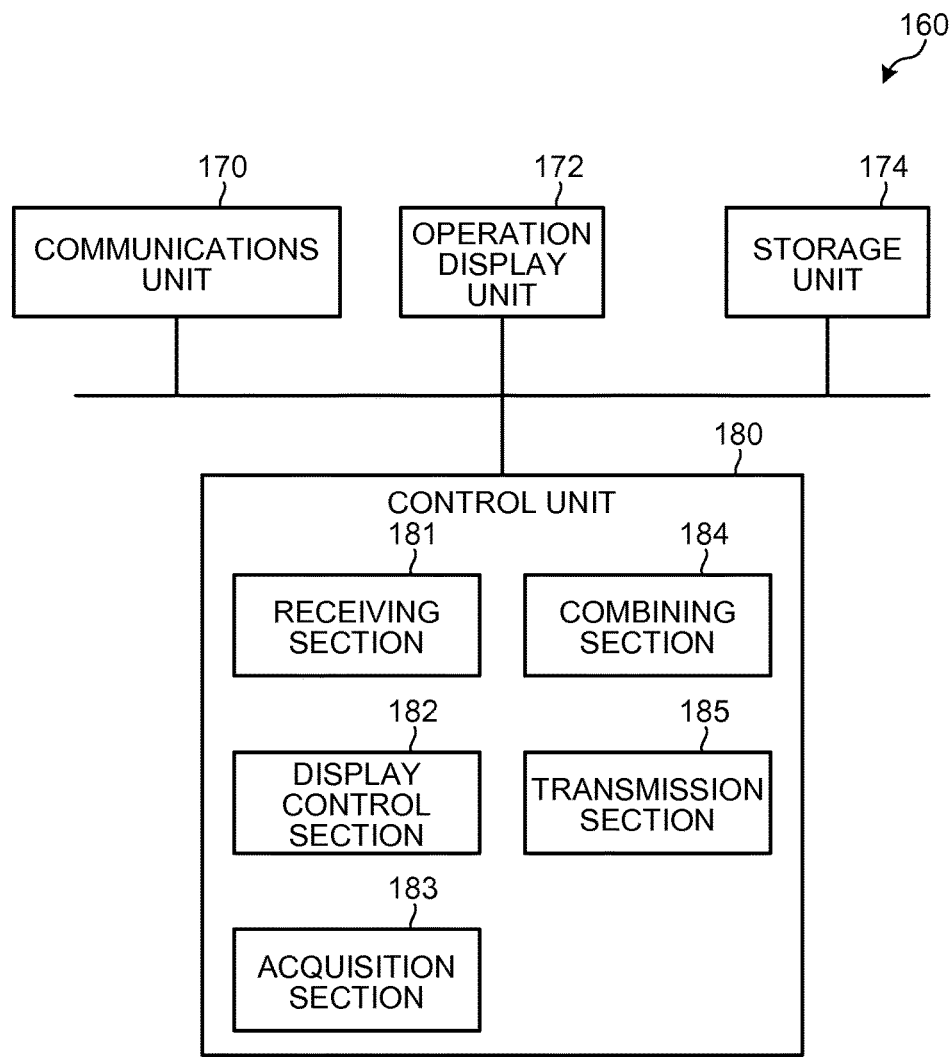
FIG. 8 is a block diagram illustrating an exemplary structure of a tablet in the first embodiment.

FIG. 8 is a block diagram illustrating an exemplary structure of the tablet 160 in the first embodiment. As illustrated in FIG. 8, the tablet 160 includes a communications unit 170, an operation display unit 172, a storage unit 174, and a control unit 180.

The communications unit 170, which communicates with the projector 110 through the network 101, can be achieved by the communications device such as the communications interface.

The operation display unit 172, which displays inputs of various types of operation and various screens, can be achieved by an operation display device such as a touch panel display.

The storage unit 174 stores therein various programs executed by the tablet 160 and various types of data used for various types of processing performed by the tablet 160. The storage unit 174 can be achieved by any of the storage devices capable of magnetically, optically, or electrically storing therein data, such as the HDD, the SSD, the memory card, the optical disk, the ROM, and the RAM, for example.

The control unit 180, which controls each unit of the tablet 160, can be achieved by the control device such as the CPU. The control unit 180 includes a receiving section 181, a display control section 182, an acquisition section 183, a combining section 184, and a transmission section 185.

The receiving section 181 receives the screen data from the projector 110. Specifically, the receiving section 181 requests the projector 110 to deliver the screen data, receives the requested screen data, and stores the received screen data in the storage unit 174. In the first embodiment, the screen data includes an aspect ratio. The screen data is, however, not limited to the aspect ratio. For example, the receiving section 181 requests the projector 110 to deliver the screen data illustrated in FIG. 3, receives the requested screen data, and stores the received screen data in the storage unit 174.

The display control section 182 causes the operation display unit 172 to display the screen based on the screen data received by the receiving section 181. Specifically, the display control section 182 acquires the screen data stored in the storage unit 174 and causes the operation display unit 172 to display the screen based on the acquired screen data at the aspect ratio included in the acquired screen data. For example, the display control section 182 acquires the screen data illustrated in FIG. 3 from the storage unit 174 and causes the operation display unit 172 to display the screen based on the acquired screen data.

In addition, when the combined screen data is produced by the combining section 184, which is described later, the display control section 182 causes the operation display unit 172 to display the screen based on the combined screen data. Specifically, the display control section 182 acquires the combined screen data stored in the storage unit 174 and causes the operation display unit 172 to display the screen based on the acquired combined screen data. For example, the display control section 182 acquires the combined screen data illustrated in FIG. 7 from the storage unit 174 and causes the operation display unit 172 to display the screen based on the acquired combined screen data.

The acquisition section 183 receives input of the handwriting information performed by a user to the screen displayed on the operation display unit 172 (e.g., a user inputs the handwriting information to the operation display unit 172 by touch operation), acquires the handwriting position information indicating the position of the handwriting information, and stores the acquired handwriting position information in the storage unit 174. As a result, the handwriting position information illustrated in FIG. 5 is stored in the storage unit 174, for example.

Figure 9:
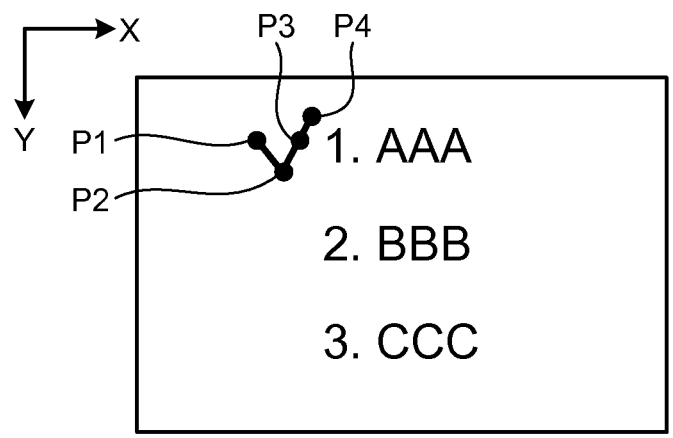
FIG. 9 is an explanatory view illustrating an example of an acquisition method of the handwriting position information performed by an acquisition section in the first embodiment.

FIG. 9 is an explanatory view illustrating an example of an acquisition method of the handwriting position information performed by the acquisition section 183 in the first embodiment. In the example illustrated in FIG. 9, it is assumed that the handwriting position information is drawn in the order of points P1, P2, P3, and P4 on the screen displayed on the operation display unit 172. In this case, when a user makes a touch on the screen at the point P1, the acquisition section 183 acquires the coordinates (30,25) of the point P1 and stores the coordinates in the storage unit 174, when the position of the touch moves from the point P1 to the point P2, the acquisition section 183 acquires the coordinates (35,30) of the point P2 and stores the coordinates in the storage unit 174, when the position of the touch moves from the point P2 to the point P3, the acquisition section 183 acquires the coordinates (40,25) of the point P3 and stores the coordinates in the storage unit 174, and when the position of the touch moves from the point P3 to the point P4, the acquisition section 183 acquires the coordinates (45,20) of the point P4 and stores the coordinates in the storage unit 174.

The combining section 184 produces the handwriting image data that is the image data of the handwriting information using the handwriting position information acquired by the acquisition section 183, and stores the produced handwriting image data in the storage unit 174. Then, the combining section 184 produces the combined screen data by combining the produced handwriting image data with the screen data stored in the storage unit 174, and stores the produced combined screen data in the storage unit 174.

Figure 7:
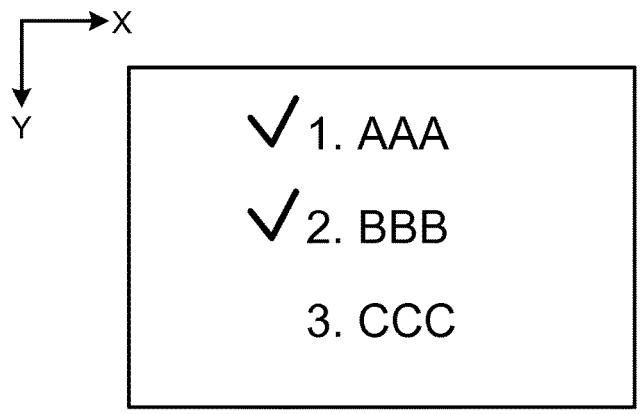
FIG. 7 is a schematic diagram illustrating an example of combined screen data in the first embodiment.

For example, the combining section 184 produces the handwriting image data illustrated in FIG. 6 using the handwriting position information illustrated in FIG. 5, which is stored in the storage unit 174, and produces the combined screen data illustrated in FIG. 7 by combining the handwriting image data illustrated in FIG. 6 with the screen data illustrated in FIG. 3, which is stored in the storage unit 174.

The transmission section 185 transmits the handwriting position information acquired by the acquisition section 183 to the projector 110. In the first embodiment, the transmission section 185 transmits a pair of coordinates, which are the previous coordinates (just before input) and the current coordinates (just input), to the projector 110 sequentially as the handwriting position information while the handwriting position information is acquired by the acquisition section 183.

In the example illustrated in FIG. 9, when the coordinates of the point P2 are acquired, the transmission section 185 transmits a pair of the coordinates (30,25) of the point P1 and the coordinates (35,30) of the point P2 to the projector 110, when the coordinates of the point P3 are acquired, the transmission section 185 transmits a pair of the coordinates (35,30) of the point P2 and the coordinates (40,25) of the point P3 to the projector 110, and when the coordinates of the point P4 are acquired, the transmission section 185 transmits a pair of the coordinates (40,25) of the point P3 and the coordinates (45,20) of the point P4 to the projector 110.

Figure 10:
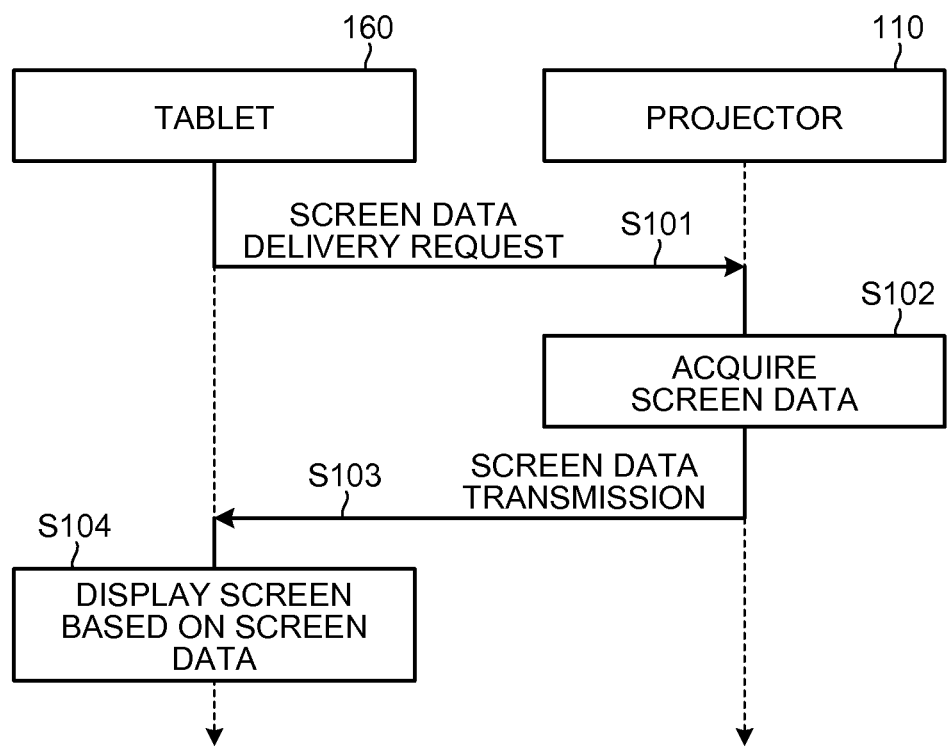
FIG. 10 is a sequence diagram illustrating an example of delivery processing executed by the image combining system in the first embodiment.

FIG. 10 is a sequence diagram illustrating an example of delivery processing executed by the image combining system 100 in the first embodiment.

The receiving section 181 of the tablet 160 requests the projector 110 to deliver the screen data (step S101).

The delivery section 141 of the projector 110 receives the delivery request of the screen data from the tablet 160 and acquires from the image data storage section 131 the screen data received as the delivery request (step S102), and delivers the acquired screen data to the tablet 160 (step S103).

The receiving section 181 of the tablet 160 receives the screen data from the projector 110, and the display control section 182 of the tablet 160 causes the operation display unit 172 to display the screen based on the screen data received by the receiving section 181 (step S104).

Figure 11:
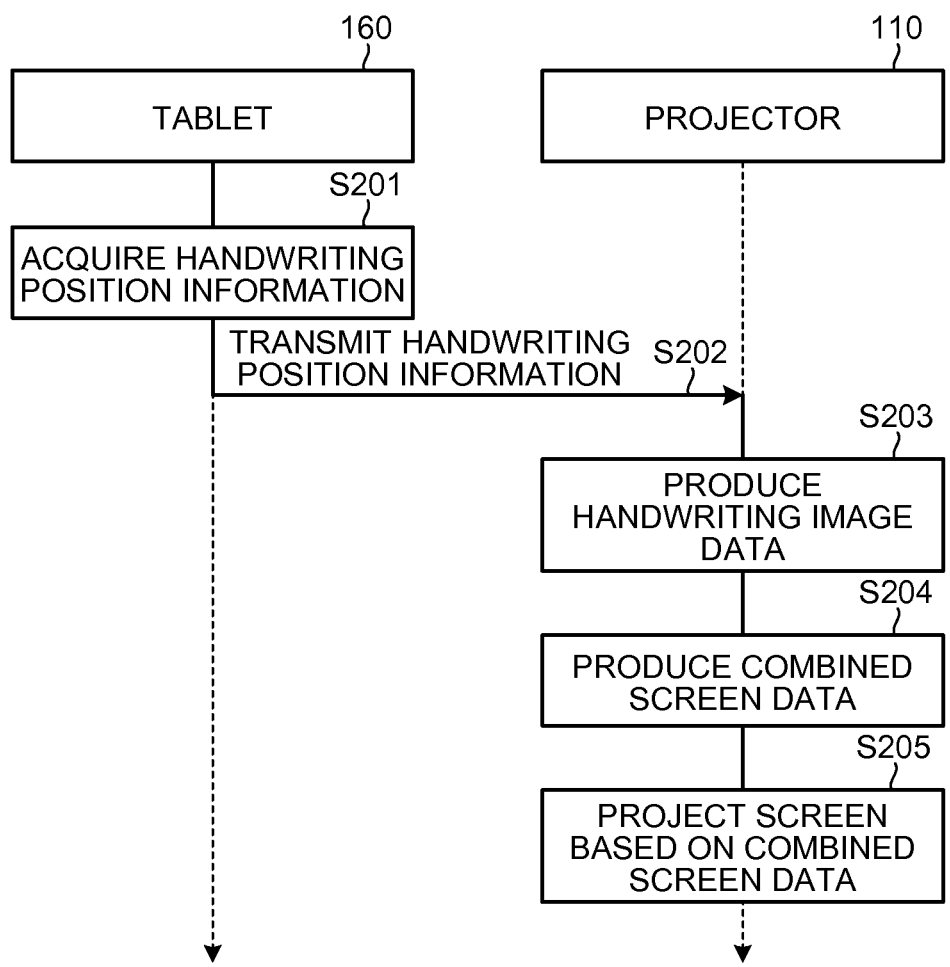
FIG. 11 is a sequence diagram illustrating an example of projection processing executed by the image combining system in the first embodiment.

FIG. 11 is a sequence diagram illustrating an example of projection processing executed by the image combining system 100 in the first embodiment. The processing illustrated in FIG. 11 is repeated at a certain period while a user inputs the handwriting information to the tablet 160.

The acquisition section 183 of the tablet 160 receives input of the handwriting information performed by a user to the screen displayed on the operation display unit 172, and acquires the handwriting position information indicating the position of the handwriting information (step S201).

The transmission section 185 of the tablet 160 transmits the handwriting position information acquired by the acquisition section 183 to the projector 110 (step S202).

The receiving section 142 of the projector 110 receives the handwriting position information from the tablet 160 and stores the received handwriting position information in the handwriting position information storage section 132. The generation section 143 of the projector 110 produces the handwriting image data using the handwriting position information stored in the handwriting position information storage section 132, and stores the produced handwriting image data in the image data storage section 131 (step S203).

The combining section 144 of the projector 110 produces the combined screen data by combining the screen data with the handwriting image data that are stored in the image data storage section 131, and stores the combined screen data that has just been produced in the image data storage section 131 (step S204).

When receiving the combined screen data that is stored in the image data storage section 131 and transferred by the control unit 140, the projection unit 150 projects the screen based on the combined screen data (step S205).

Figure 12:
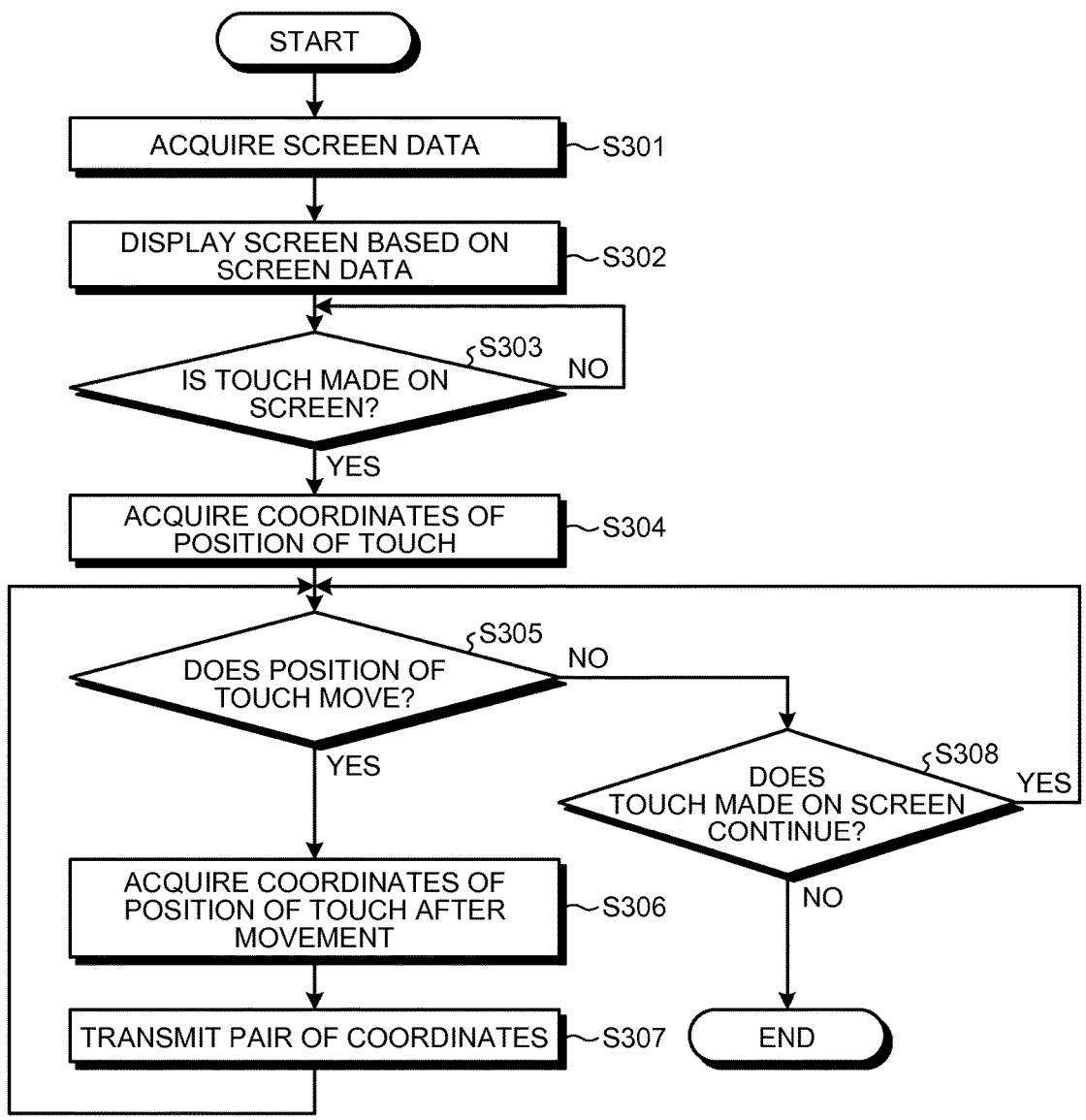
FIG. 12 is a flowchart illustrating an example of handwriting position information transmission processing executed by the tablet in the first embodiment.

FIG. 12 is a flowchart illustrating an example of handwriting position information transmission processing executed by the tablet 160 in the first embodiment.

The receiving section 181 requests the projector 110 to deliver the screen data, receives the requested screen data, and stores the received screen data in the storage unit 174 (step S301).

The display control section 182 acquires the screen data stored in the storage unit 174 and causes the operation display unit 172 to display the screen based on the acquired screen data (step S302).

The acquisition section 183 waits a touch made by a user on the screen displayed on the operation display unit 172 (No at step S303), and if a touch is made on the screen (Yes at step S303), the acquisition section 183 acquires the coordinates of the position of the touch and stores the acquired coordinates in the storage unit 174 (step S304).

If the position of the touch moves on the screen (Yes at step S305), the acquisition section 183 acquires the coordinates of the position of the touch after the movement and stores the acquired coordinates in the storage unit 174 (step S306).

The transmission section 185 transmits a pair of the previous coordinates and the current coordinates to the projector 110 as the handwriting position information (step S307), and then the processing returns to step S305. The current coordinates are the coordinates acquired at step S306. The previous coordinates are the coordinates acquired at step S304 if the handwriting position information is the first transmission by the transmission section 185 while if the handwriting position information is transmitted by the transmission section 185 after the second transmission onward, the previous coordinates become the coordinates acquired at step S306.

If the position of the touch does not move (No at step S305) and if the touch made on the screen continues (Yes at step S308), the processing returns to step S305. On the other hand, If the position of the touch does not move (No at step S305) and if no touch is made on the screen (No at step S308), the processing ends.

Figure 13:
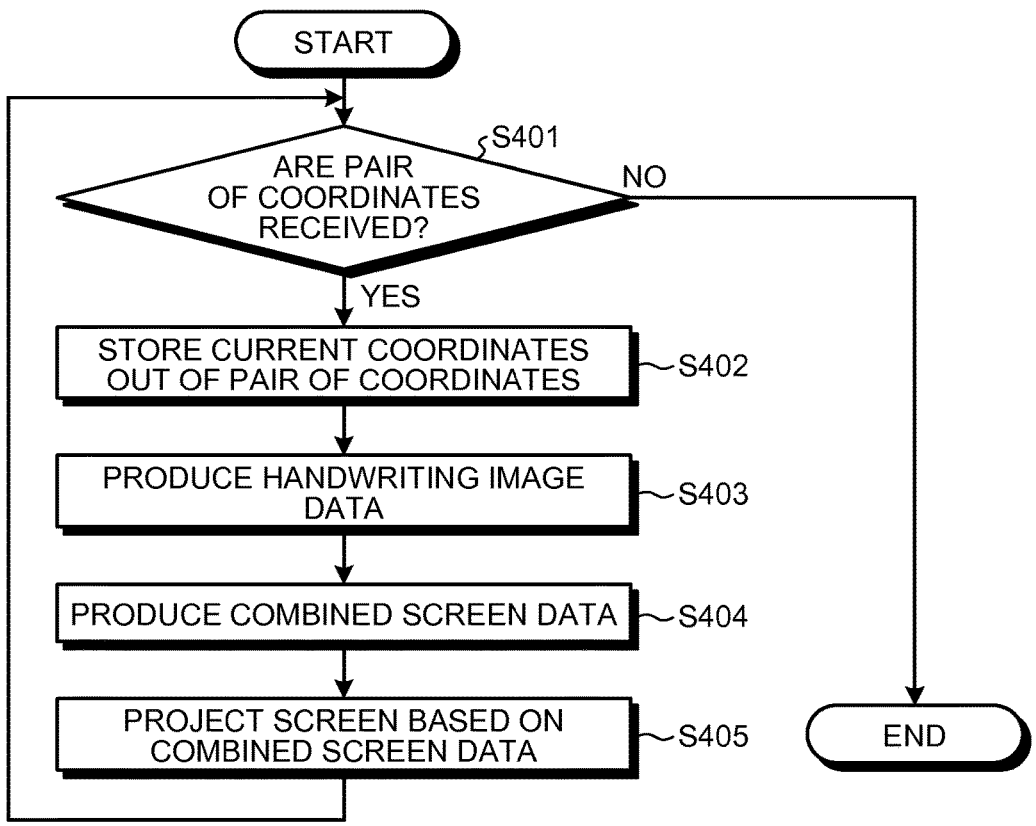
FIG. 13 is a flowchart illustrating an example of the projection processing executed by the projector in the first embodiment.

FIG. 13 is a flowchart illustrating an example of the projection processing executed by the projector 110 in the first embodiment.

If the receiving section 142 receives a pair of coordinates from the tablet 160 (Yes at step S401), the receiving section 142 stores the current coordinates out of the pair of coordinates in the handwriting position information storage section 132 as the handwriting position information (step S402).

The generation section 143 produces the handwriting image data using the handwriting position information stored in the handwriting position information storage section 132, and stores the produced handwriting image data in the image data storage section 131 (step S403).

The combining section 144 produces the combined screen data by combining the screen data with the handwriting image data that are stored in the image data storage section 131, and stores the produced combined screen data in the image data storage section 131 (step S404).

When receiving the combined screen data that is stored in the image data storage section 131 and transferred by the control unit 140, the projection unit 150 projects the screen based on the combined screen data (step S405), and the processing returns to step S401.

If the transmission of pairs of coordinates by the tablet 160 ends and if the receiving of the pairs of coordinates ends (No at step S401), the processing ends.

In the first embodiment as described above, the tablet 160 does not transmit the input handwriting information to the projector 110 as the image data, but sequentially transmits the handwriting position information of the input handwriting information to the projector 110 on line. The projector 110 produces the handwriting image data from the received handwriting position information, then produces the combined screen data by combining the produced handwriting image data with the screen data, and projects the screen based on the combined screen data.

In this way, the first embodiment enables a data amount transmitted from the tablet 160 to the projector 110 to be reduced, thereby enabling the load of the network 101 to be reduced. Accordingly, the projector 110 can produce the combined screen data in real time. As a result, when the handwriting information is input to the tablet 160, the projector 110 can project the screen using the combined screen data based on the handwriting information in real time.

First Modification

In a first modification, an example is described in which the tablet 160 magnifies or reduces the screen. In the following description, differences from the first embodiment are primarily described. The descriptions of the elements having the same functions as the first embodiment are omitted.

The tablet 160 in the first modification is described below.

The display control section 182 receives input performed by a user to the screen displayed on the operation display unit 172, magnifies or reduces the screen at a magnification ratio or a reduction rate set by magnification or reduction operation, and causes the operation display unit 172 to display the resulting screen. Hereinafter, the magnification ratio or the reduction rate is described as the magnification/reduction ratio, and the magnification or the reduction operation is described as the magnification/reduction operation. For example, when the operation display unit 172 is a touch panel display having a multi-tap function, the magnification/reduction operation corresponds to pinch-out operation or pinch-in operation to the operation display unit 172. The display control section 182 causes the operation display unit 172 to enlarge the part of the screen at which the pinch-out operation is performed with the part as the center of the enlargement at the magnification rate set by the pinch-out operation and display the resulting screen while display control section 182 causes the operation display unit 172 to reduce the part of the screen at which the pinch-in operation is performed with the part as the center of the reduction at the reduction rate set by the pinch-in operation and display the resulting screen.

The acquisition section 183 receives input of the handwriting information performed by a user to the screen after the magnification/reduction operation displayed on the operation display unit 172, acquires the handwriting position information of the handwriting information, and stores the acquired handwriting position information in the storage unit 174.

In addition, the acquisition section 183 magnifies or reduces the acquired handwriting position information at the inverse of the magnification/reduction rate (1/(magnification/reduction rate)) of the magnified or reduced screen, and stores the resulting handwriting position information in the storage unit 174. This magnification/reduction operation enables the handwriting position information (coordinates) of the magnified or reduced screen to be converted into the handwriting position information (coordinates) of the original screen (screen before being magnified or reduced).

The combining section 184 produces the handwriting image data that is the image data of the handwriting information using the handwriting position information (the handwriting position information that is not magnified or reduced at the inverse of the magnification/reduction rate) acquired by the acquisition section 183.

The transmission section 185 transmits the handwriting position information magnified or reduced by the acquisition section 183 at the inverse of the magnification/reduction rate to the projector 110.

Figure 14:
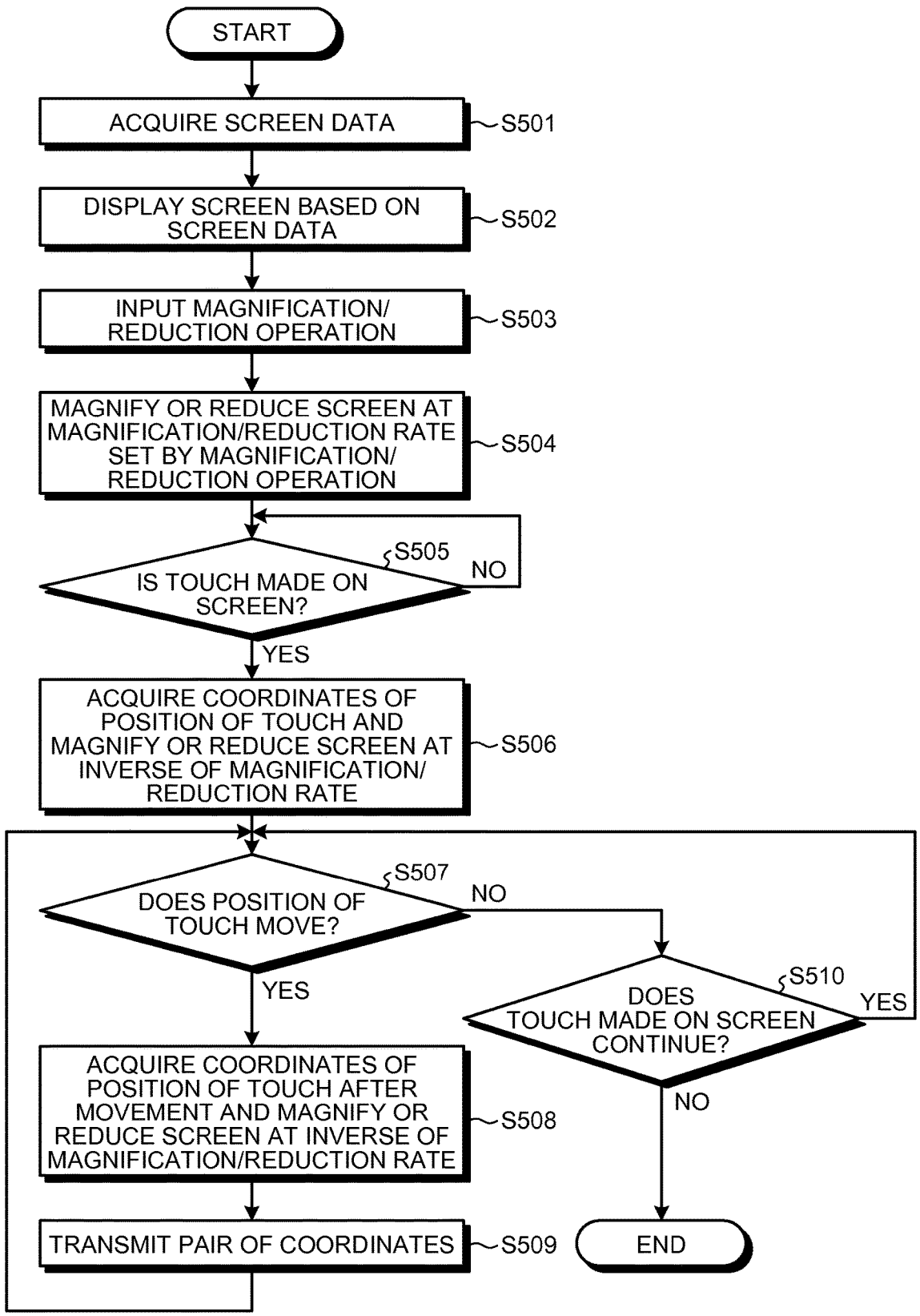
FIG. 14 is a flowchart illustrating an example of the handwriting position information transmission processing executed by the tablet in a first modification.

FIG. 14 is a flowchart illustrating an example of the handwriting position information transmission processing executed by the tablet 160 in the first modification.

The processing performed at step S501 and step S502 is the same as that performed at step S301 and step S302 of the flowchart in FIG. 12.

The display control section 182 receives input of the magnification/reduction operation performed by a user to the screen displayed on the operation display unit 172 (step S503), magnifies or reduces the screen at a magnification/reduction rate set by the magnification/reduction operation, and causes the operation display unit 172 to display the resulting screen (step S504).

The acquisition section 183 waits a touch made by a user on the screen displayed on the operation display unit 172 (No at step S505), and if a touch is made on the screen (Yes at step S505), the acquisition section 183 acquires the coordinates of the position of the touch, magnifies or reduces the acquired coordinates at the inverse of the magnification/reduction rate (1/(magnification/reduction rate)) of the magnified or reduced screen, and stores the resulting coordinates in the storage unit 174 (step S506).

If the position of the touch moves on the screen (Yes at step S507), the acquisition section 183 acquires the coordinates of the position of the touch after the movement, magnifies or reduces the acquired coordinates at the inverse of the magnification/reduction rate (1/(magnification/reduction rate)) of the magnified or reduced screen, and stores the acquired coordinates in the storage unit 174 (step S508).

The transmission section 185 transmits a pair of the previous coordinates and the current coordinates to the projector 110 as the handwriting position information (step S509), and then the processing returns to step S507. The current coordinates are the coordinates magnified or reduced at step S508. The previous coordinates are the coordinates magnified or reduced at step S506 if the handwriting position information is the first transmission by the transmission section 185 while if the handwriting position information is transmitted by the transmission section 185 after the second transmission onward, the previous coordinates are the coordinates magnified or reduced at step S508 in the previous processing loop from step S507 to step S509.

If the position of the touch does not move (No at step S507) and the touch made on the screen continues (Yes at step S510), the processing returns to step S507. On the other hand, if the position of the touch does not move (No at step S507) and if no touch is made on the screen (No at step S510), the processing ends.

In the first modification described as above, the tablet 160 transmits the handwriting position information the size of which is adjusted to the size of the original screen (the screen that is not magnified or reduced) to the projector 110 even when the screen is magnified or reduced, thereby enabling the projector 110 to produce combined screen data without being influenced by the magnification/reduction rate of the screen and project the screen based on the combined screen data. Accordingly, the screen can be magnified or reduced by the tablet 160. As a result, the handwriting information can be correctively input (write in) to even a small space by enlarging the screen, for example.

In the first modification, the size of the handwriting position information is adjusted to the size of the original screen (the screen that is not magnified or reduced) by the tablet 160. The size of the handwriting position information may be, however, adjusted to the size of the original screen (the screen that is not magnified or reduced) by the projector 110. In this case, the tablet 160 transmits the magnification/reduction rate of the screen to the projector 110 together with the handwriting position information acquired by the acquisition section 183.

Second Modification

In a second modification, an example is described in which the tablet 160 deletes the handwriting position information. In the following description, differences from the first embodiment are primarily described. The descriptions of the elements having the same functions as the first embodiment are omitted.

The tablet 160 in the second modification is described below.

The acquisition section 183 receives input of deletion information to delete at least a part of the handwriting information drawn on the screen displayed on the operation display unit 172 (e.g., a user inputs a part to be deleted from the handwriting information drawn on the screen by touch operation), acquires the deletion position information indicating the position of the deletion information, and stores the acquired deletion position information in the storage unit 174. In the second modification, the deletion information indicates two-dimensional coordinates (x,y) on the screen in the same manner as the handwriting position information. The deletion information is, however, not limited to indicating the two-dimensional coordinates (x,y).

In the second modification, the control unit 180 manages an input mode of the handwriting information and an input mode of the deletion information. When a user performs input by touch operation to the screen in the input mode of the handwriting information, the acquisition section 183 receives the input of the handwriting information. When a user performs input by touch operation to the screen in the input mode of the deletion information, the acquisition section 183 receives the input of the deletion information.

The combining section 184 produces the handwriting image data using the handwriting position information and the deletion position information that are acquired by the acquisition section 183, and stores the produced handwriting image data in the storage unit 174.

The transmission section 185 transmits the deletion position information acquired by the acquisition section 183 to the projector 110. The transmission section 185 transmits a pair of the coordinates, which are the previous coordinates (just before input) and the current coordinates (just input), to the projector 110 sequentially as the deletion position information while the deletion position information is acquired by the acquisition section 183, in the same manner as the transmission of the handwriting position information.

In the second modification, when transmitting the handwriting position information, the transmission section 185 transmits an identifier indicating that a pair of coordinates are those of the handwriting position information together with the pair of coordinates while when transmitting the deletion position information, the transmission section 185 transmits an identifier indicating that a pair of coordinates are those of the deletion position information together with the pair of coordinates.

The projector 110 in the second modification is described below.

The receiving section 142 receives the deletion position information indicating the position of a part to be deleted from the handwriting information and stores the received deletion position information in the handwriting position information storage section 132. Specifically, the receiving section 142 sequentially receives a pair of coordinates from the tablet 160 and stores the current coordinates out of the pair of coordinates as the deletion position information in the handwriting position information storage section 132 while the deletion information is input to the tablet 160, in the same manner as the receiving of the handwriting position information.

In the second modification, when receiving the handwriting position information, the receiving section 142 receives the identifier indicating that a pair of coordinates are those of the handwriting information together with the pair of coordinates, and stores the current coordinates out of the pair of coordinates in the handwriting position information storage section 132 so as to correspond to the identifier. Likewise, when receiving the deletion position information, the receiving section 142 receives the identifier indicating that a pair of coordinates are those of the deletion information together with the pair of coordinates, and stores the current coordinates out of the pair of coordinates in the handwriting position information storage section 132 so as to correspond to the identifier.

Figures 15, 16:
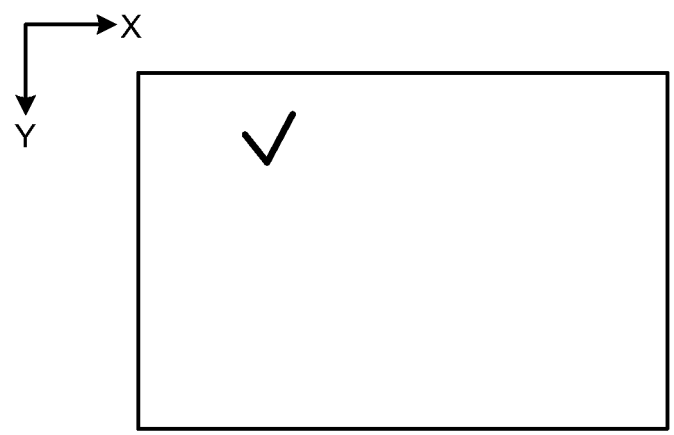
FIG. 15 is a schematic diagram illustrating an example of the handwriting position information and deletion position information that are stored in the handwriting position information storage section in a second modification.
FIG. 16 is a schematic diagram illustrating an example of the handwriting image data in the second modification.

FIG. 15 is a schematic diagram illustrating an example of the handwriting position information and the deletion position information that are stored in the handwriting position information storage section 132 in the second modification. In the example illustrated in FIG. 15, type "1" indicates the handwriting position information while type "0" indicates the deletion position information. As a result, the coordinates stored in the handwriting position information storage section 132 can be identified as the coordinates of the handwriting position information or the coordinates of the deletion information.

The generation section 143 produces the handwriting image data using the handwriting position information and the deletion position information that are received by the receiving section 142. For example, the generation section 143 connects the adjacent coordinates of the handwriting position information in time series with a line and deletes the line connecting the adjacent coordinates of the delete position information in time series using the handwriting position information and the deletion position information illustrated in FIG. 15, thereby producing the handwriting image data illustrated in FIG. 16.

The combining section 144 produces the combined screen data by combining the screen data with the handwriting image data produced by the generation section 143. For example, the combining section 144 produces the combined screen data illustrated in FIG. 17 by combining the screen data illustrated in FIG. 3 with the handwriting image data illustrated in FIG. 16.

In the second modification as described above, the tablet 160 transmits the deletion position information to the projector 110 when deleting the handwriting information, thereby enabling the projector 110 to produce the combined screen data by reflecting the deletion of the handwriting information and project the screen based on the produced combined screen data.

Third Modification

In a third modification, an example is described in which the handwriting information input at designated time is combined with the screen and the resulting screen is projected. In the following description, differences from the first embodiment are primarily described. The descriptions of the elements having the same functions as the first embodiment are omitted.

The projector 110 in the third modification is described below.

Figures 17, 18:
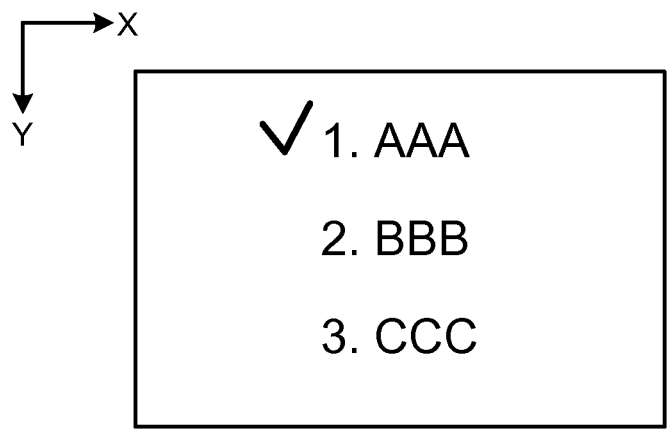
FIG. 17 is a schematic diagram illustrating an example of the combined screen data in the second modification.
FIG. 18 is a schematic diagram illustrating an example of the handwriting position information stored in the handwriting position information storage section in a third modification.

The receiving section 142 receives the handwriting position information from the tablet 160 and stores the received handwriting position information in the handwriting position information storage section 132 so as to correspond to input time information indicating the input time of the handwriting position information. Specifically, the receiving section 142 sequentially receives a pair of coordinates from the tablet 160 and stores the current coordinates out of the pair of coordinates in the handwriting position information storage section 132 so as to correspond to the input time information indicating the input time of the current coordinates while the handwriting information is input to the tablet 160. FIG. 18 is a schematic diagram illustrating an example of the handwriting position information stored in the handwriting position information storage section 132 in the third modification. In the example illustrated in FIG. 18, the coordinates of the handwriting position information correspond to the input time of the coordinates.

In the second modification, the input time of the handwriting position information is the time at which the receiving section 142 receives the handwriting position information. The input time is, however, not limited to the receiving time. For example, the input time of the handwriting position information may be the time at which the handwriting position information is input to the tablet 160. In this case, the receiving section 142 receives the input time of the handwriting position information from the tablet 160.

In addition, the receiving section 142 receives, from the tablet 160, time designation information designating the input time of a part to be reproduced of the handwriting information.

The generation section 143 acquires from the handwriting position information storage section 132 the handwriting position information of the part corresponding to the input time designated by the time designation information received by the receiving section 142 of the handwriting position information, and produces the handwriting image data of the part to be reproduced of the handwriting information using the acquired handwriting position information.

For example, it is assumed that the input time designated by the time designation information received by the receiving section 142 is from 10:00 to 10:05. In this case, the generation section 143 acquires from the handwriting position information storage section 132 the handwriting position information corresponding to the input time of 10:00 of the handwriting position information illustrated in FIG. 18, and produces the handwriting image data illustrated in FIG. 16 using the acquired handwriting position information.

The combining section 144 produces the combined screen data by combining the screen data with the handwriting image data produced by the generation section 143. For example, the combining section 144 produces the combined screen data illustrated in FIG. 17 by combining the screen data illustrated in FIG. 3 with the handwriting image data illustrated in FIG. 16.

The tablet 160 in the third modification is described below.

The transmission section 185 transmits the time designation information designating the input time of a part to be reproduced of the handwriting information from the projector 110.

Figure 19:
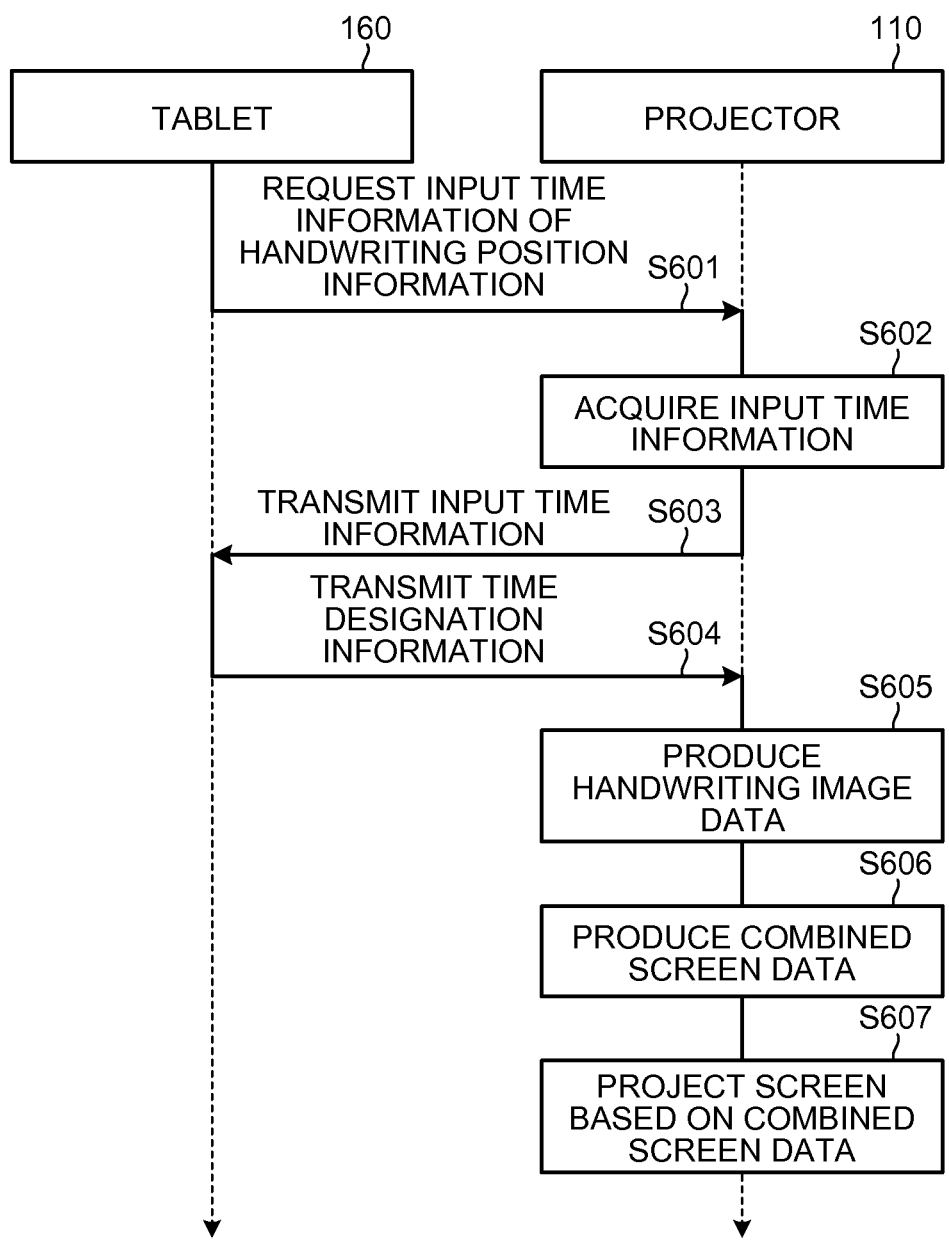
FIG. 19 is a sequence diagram illustrating an example of the projection processing executed by the image combining system in the third modification.

FIG. 19 is a sequence diagram illustrating an example of the projection processing executed by the image combining system 100 in the third modification.

The control unit 180 of the tablet 160 requests the projector 110 to deliver the input time information of the handwriting position information (step S601).

The control unit 140 of the projector 110 receives the request of the input time information from the tablet 160 and acquires the input time information from the handwriting position information storage section 132 (step S602), and transmits the acquired input time information (a range of the input time) to the tablet 160 (step S603). For example, the control unit 140 transmits the input time information indicating the input time ranging from 10:00 to 10:10 to the tablet 160 when the handwriting position information is as illustrated in FIG. 18.

The control unit 180 of the tablet 160 receives the input time information from the projector 110, causes the operation display unit 172 to display the received input time information, and receives input of the time designation information from a user. The transmission section 185 of the tablet 160 transmits the input time designation information to the projector 110 (step S604).

The receiving section 142 of the projector 110 receives the input time designation information from the tablet 160. The generation section 143 of the projector 110 acquires from the handwriting position information storage section 132 the handwriting position information of the part corresponding to the input time designated by the time designation information received by the receiving section 142 of the handwriting position information, produces the handwriting image data of the part to be reproduced of the handwriting information using the acquired handwriting position information, and stores the produced handwriting image data in the image data storage section 131 (step S605).

The combining section 144 of the projector 110 produces the combined screen data by combining the screen data with the handwriting image data that are stored in the image data storage section 131, and stores the produced combined screen data in the image data storage section 131 (step S606).

When receiving the combined screen data that is stored in the image data storage section 131 and transferred by the control unit 140, the projection unit 150 of the projector 110 projects the screen based on the combined screen data (step S607).

In the third modification as described above, the projector 110 can produce the combined screen data by reflecting only the handwriting information input in a specific time range and project the screen on the basis of the produced combined screen data. Thus, this system is preferable for being used in meetings and lessons, for example.

Second Embodiment

In a second embodiment, an example is described in which a plurality of tablets are included in the system. In the following descriptions, differences from the first embodiment are mainly described. The same name and reference numeral of the first embodiment are given to the element having the same function as the first embodiment, and description thereof is omitted.

Figure 20:
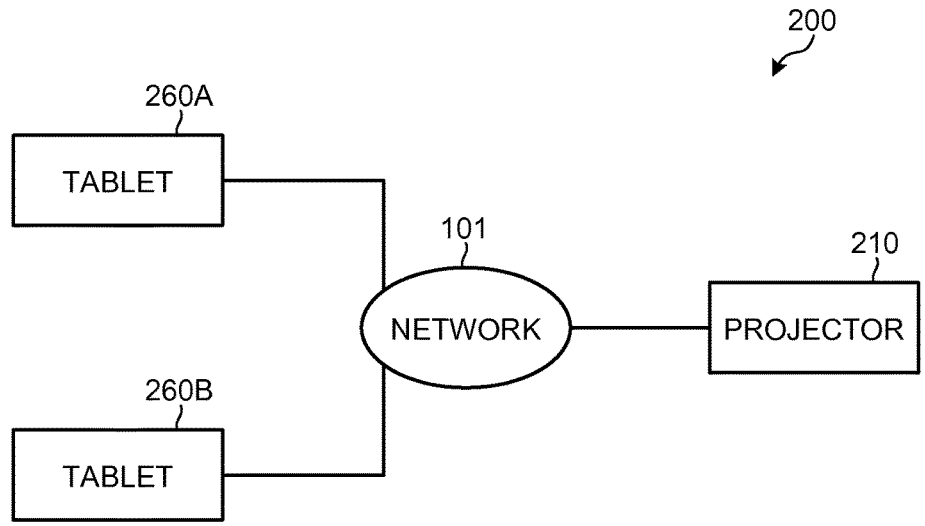
FIG. 20 is a block diagram illustrating an exemplary structure of an image combining system according to a second embodiment.

FIG. 20 is a block diagram illustrating an exemplary structure of an image combining system 200 according to the second embodiment. As illustrated in FIG. 20, the image combining system 200 includes a projector 210 and tablets 260A and 260B. The projector 210 and the tablets 260A and 260B are coupled through the network 101. The number of tablets is not limited to two, and may be equal to or larger than two.

Figure 21:
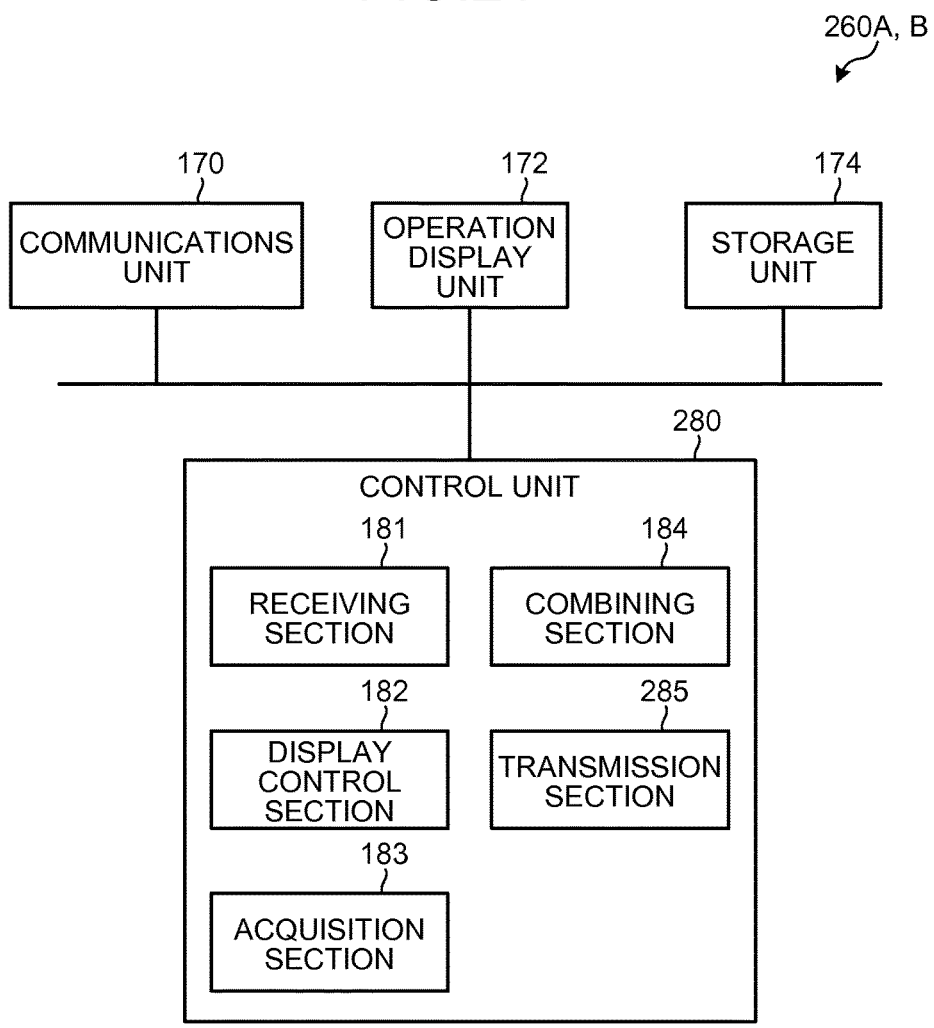
FIG. 21 is a block diagram illustrating an exemplary structure of tablets in the second embodiment.

FIG. 21 is a block diagram illustrating an exemplary structure of the tablets 260A and 260B in the second embodiment. In the tablets 260A and 260B, a transmission section 285 included in a control unit 280 differs from the corresponding section of the tablet 160 in the first embodiment.

The transmission section 285 transmits, to the projector 110, terminal identification information identifying the tablet itself together with the handwriting position information acquired by the acquisition section 183. For example, the transmission section 285 of a tablet 160A transmits the terminal identification information of the tablet 160A while the transmission section 285 of a tablet 160B transmits the terminal identification information of the tablet 160B. As a result, the terminal identification information enables the projector 210 to identify the tablet from which the handwriting position information is transmitted.

Figure 22:
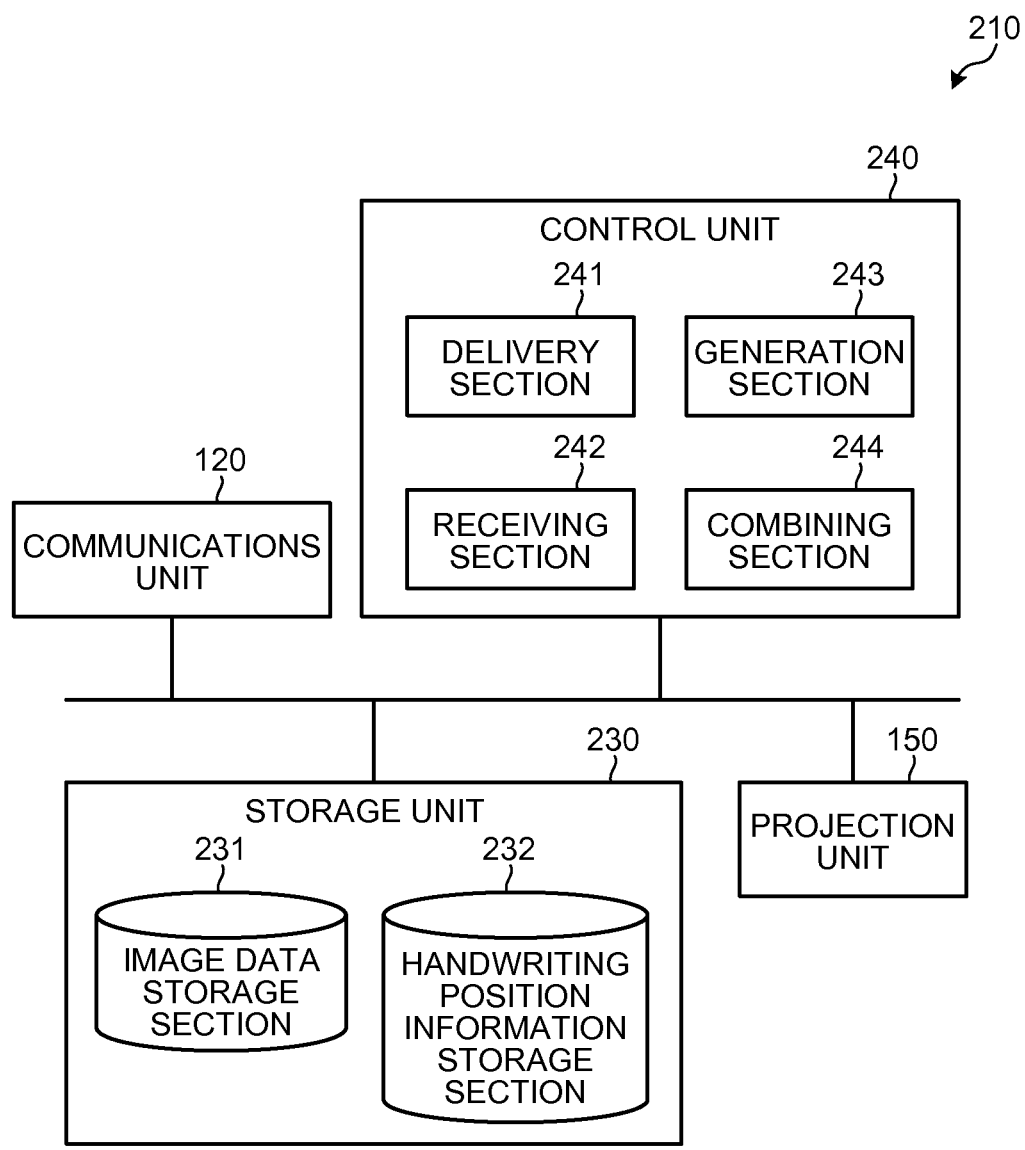
FIG. 22 is a block diagram illustrating an exemplary structure of a projector in the second embodiment.

FIG. 22 is a block diagram illustrating an exemplary structure of the projector 210 in the second embodiment. In the projector 210, a storage unit 230 including an image data storage section 231 and a handwriting position information storage section 232, and a control unit 240 including a delivery section 241, a receiving section 242, a generation section 243, and a combining section 244 differ from corresponding units and sections of the projector 110 in the first embodiment.

The delivery section 241 delivers the screen data to the tablets 260A and 260B.

The receiving section 242 receives the handwriting position information from the tablets 260A and 260B and stores the received handwriting position information in the handwriting position information storage section 232. The receiving section 242 stores the handwriting position information in the handwriting position information storage section 232 for each terminal identification information of the tablets because the receiving section 242 receives the handwriting position information together with the terminal identification information of the tablet that is the transmission origin of the handwriting position information.

Figures 23, 24:
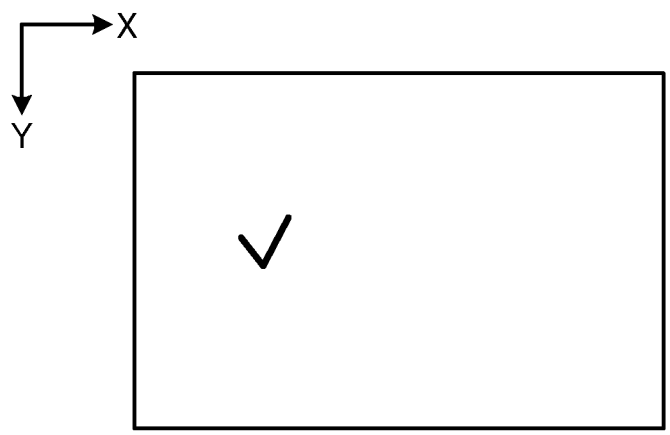
FIG. 23 is a schematic diagram illustrating an example of the handwriting position information stored in a handwriting position information storage section in the second embodiment.
FIG. 24 is a schematic diagram illustrating an example of the handwriting image data in the second embodiment.

FIG. 23 is a schematic diagram illustrating an example of the handwriting position information stored in the handwriting position information storage section 232 in the second embodiment. In the example illustrated in FIG. 23, the coordinates correspond to the terminal identification information indicating "A", or the other terminal identification information indicating "B". The tablet 260A is indicated as "A" while the tablet 260B is indicated as "B". As a result, the coordinates stored in the handwriting position information storage section 132 can be identified as the coordinates of the tablet 260A or the coordinates of the tablet 260B.

The generation section 243 produces the handwriting image data of the tablet 260A using the handwriting position information of the tablet 260A received by the receiving section 242, and also produces the handwriting image data of the tablet 260B using the handwriting position information of the tablet 260B received by the receiving section 242.

For example, the generation section 243 acquires from the handwriting position information storage section 232 the handwriting position information corresponding to the terminal identification information indicating "A" of the handwriting position information illustrated in FIG. 23, produces the handwriting image data of the tablet 260A illustrated in FIG. 16, and stores the produced handwriting image data in the image data storage section 231. For another example, the generation section 243 acquires from the handwriting position information storage section 232 the handwriting position information corresponding to the terminal identification information indicating "B" of the handwriting position information illustrated in FIG. 23, produces the handwriting image data of the tablet 260B illustrated in FIG. 24, and stores the produced handwriting image data in the image data storage section 231.

The combining section 244 produces the combined screen data by combing the screen data with the handwriting image data of the tablet 260A and the handwriting image data of the tablet 260B that are produced by the generation section 243, and stores the combined screen data in the image data storage section 231. For example, a combining section 344 produces the combined screen data illustrated in FIG. 7 by combining the screen data illustrated in FIG. 3 with the handwriting image data of the tablet 260A illustrated in FIG. 16 and the handwriting image data of the tablet 260B illustrated in FIG. 24.

Figure 25:
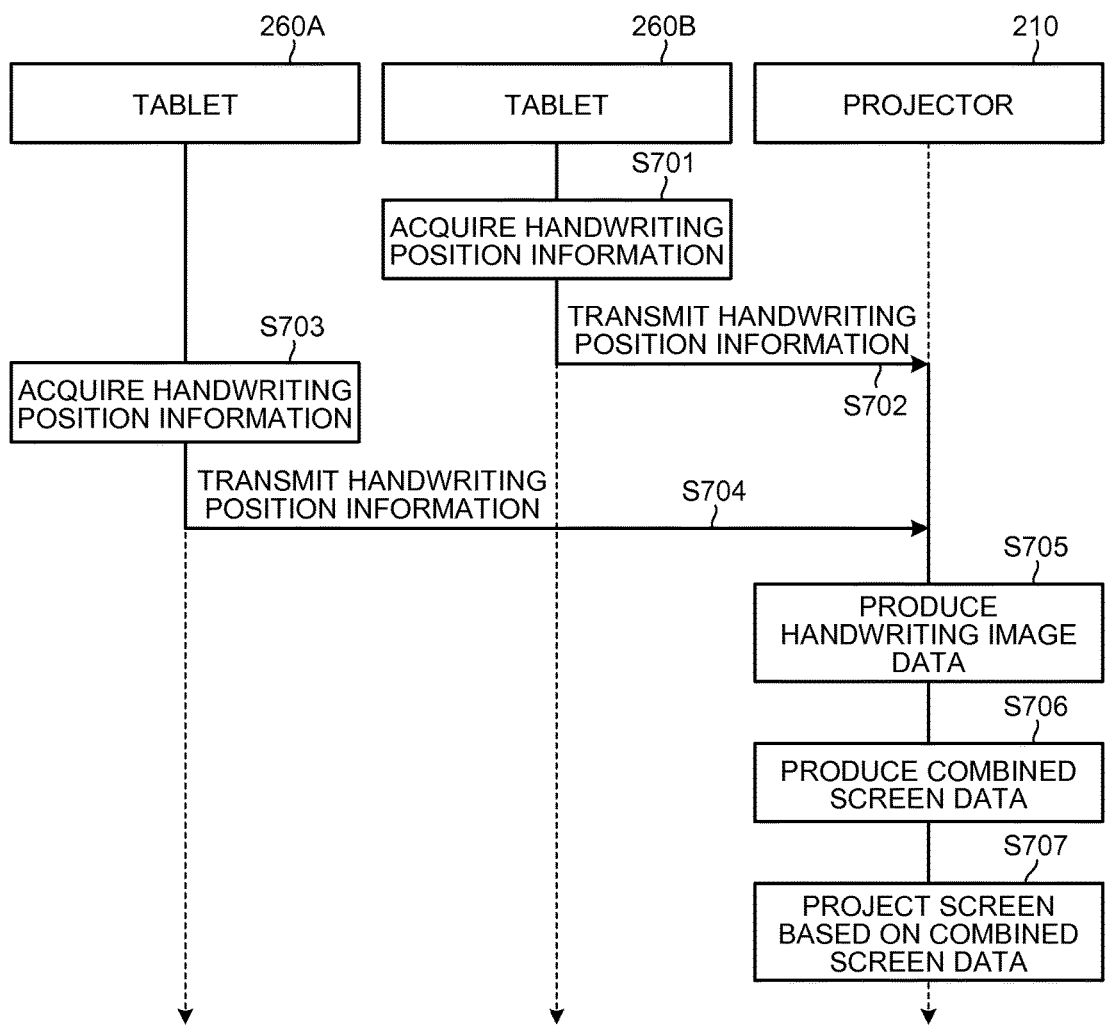
FIG. 25 is a sequence diagram illustrating an example of the projection processing executed by the image combining system in the second embodiment.

FIG. 25 is a sequence diagram illustrating an example of the projection processing executed by the image combining system 200 in the second embodiment.

The acquisition section 183 of the tablet 260B receives input of the handwriting information performed by a user to the screen displayed on the operation display unit 172, and acquires the handwriting position information indicating the position of the handwriting information (step S701).

The transmission section 285 of the tablet 260B transmits the handwriting position information acquired by the acquisition section 183 to the projector 210 (step S702).

The acquisition section 183 of the tablet 260A receives input of the handwriting information performed by a user to the screen displayed on the operation display unit 172, and acquires the handwriting position information indicating the position of the handwriting information (step S703).

The transmission section 285 of the tablet 260A transmits the handwriting position information acquired by the acquisition section 183 to the projector 210 (step S704).

The receiving section 242 of the projector 210 receives the handwriting position information from the tablets 260A and 260B, and stores the received handwriting position information in the handwriting position information storage section 232 for each tablet. The generation section 243 of the projector 210 produces the handwriting image data of the tablet 260A using the handwriting position information of the tablet 260A stored in the handwriting position information storage section 232, and also produces the handwriting image data of the tablet 260B using the handwriting position information of the tablet 260B stored in the handwriting position information storage section 232, and stores the produced handwriting image data in the image data storage section 231 (step S705).

The combining section 244 of the projector 210 produces the combined screen data by combining the screen data with the handwriting image data of the tablet 260A and the handwriting image data of the tablet 260B that are stored in the image data storage section 231, and stores the produced combined screen data in the image data storage section 231 (step S706).

When receiving the combined screen data that is stored in the image data storage section 231 and transferred by the control unit 240, the projection unit 150 of the projector 210 projects the screen based on the combined screen data (step S707).

As described above, the second embodiment enables the combined screen data reflecting the handwriting information input from the tablets to be produced and the screen based on the produced combined screen data to be projected. This system is preferable for being used in meetings and lessons, for example.

Third Embodiment

In a third embodiment, an example is described in which the handwriting image data is colored and a color is changed on a tablet-by-tablet basis. In the following descriptions, differences from the second embodiment are mainly described. The same name and reference numeral of the second embodiment are given to the element having the same function as the second embodiment, and description thereof is omitted.

FIG. 26 is a block diagram illustrating an exemplary structure of a projector 310 of an image combining system 300 according to the third embodiment. In the projector 310, a storage unit 330 additionally including a combination color table storage section 333 and a control unit 340 including the combining section 344 differ from the corresponding units and sections of the projector 210 in the second embodiment.

The combination color table storage section 333 stores therein a combination color table in which the terminal identification information identifying the tablet corresponds to color information indicating a color used for coloring the handwriting image data. FIG. 27 is a schematic diagram illustrating an example of the combination color table stored in the combination color table storage section 333 in the third embodiment. In the example illustrated in FIG. 27, the terminal identification information indicating "A" corresponds to the color information indicating red while the terminal identification information indicating "B" corresponds to the color information indicating blue.

The combining section 344 refers to the combination color table, combines the handwriting image data of the tablet 260A colored in the color indicated by the color information corresponding to the terminal identification information of the tablet 260A with the screen data, and combines the handwriting image data of the tablet 260B colored in the color indicated by the color information corresponding to the terminal identification information of the tablet 260B with the screen data.

For example, the combining section 344 refers to the combination color table illustrated in FIG. 27, combines the handwriting image data of the tablet 260A colored in red indicated by the color information corresponding to the terminal identification information indicating "A" with the screen data, and combines the handwriting image data of the tablet 260B colored in blue indicated by the color information corresponding to the terminal identification information indicating "B" with the screen data.

As described above, the third embodiment enables the handwriting information to be colored in different colors on a tablet-by-tablet basis when the combined screen data is produced on the basis of the handwriting information input from the tablets and the screen based on the combined screen data is projected, thereby enabling visibility to be enhanced. This system is preferable for meetings and lessons, for example.

Fourth Embodiment

In a fourth embodiment, an example is described in which implementation or non-implementation of the combining of the handwriting image data is switched on a tablet-by-tablet basis. In the following descriptions, differences from the second embodiment are mainly described. The same name and reference numeral of the second embodiment are given to the element having the same function as the second embodiment, and description thereof is omitted.

FIG. 28 is a block diagram illustrating an exemplary structure of a projector 410 of an image combining system 400 according to the fourth embodiment. In the projector 410, a storage unit 430 additionally including a combining determination table storage section 433 and a control unit 440 including a combining section 444 differ from the corresponding units and sections of the projector 210 in the second embodiment.

The combining determination table storage section 433 stores therein a combining determination table in which the terminal identification information identifying the tablet corresponds to combining implementation/non-implementation information indicating whether the handwriting image data is combined. FIG. 29 is a schematic diagram illustrating an example of the combining determination table stored in the combining determination table storage section 433 in the fourth embodiment. In the example illustrated in FIG. 29, the terminal identification information indicating "A" corresponds to the combining implementation/non-implementation information indicating the implementation while the terminal identification information indicating "B" corresponds to the combining implementation/non-implementation information indicating the non-implementation.

The combining section 444 refers to the combining determination table; combines the handwriting image data of the tablet 260A with the screen data when the combining implementation/non-implementation information corresponding to the terminal identification information of the tablet 260A indicates the implementation of combining; and does not combine the handwriting image data of the tablet 260B with the screen data when the combining implementation/non-implementation information corresponding to the terminal identification information of the tablet 260B indicates the non-implementation of combining.

For example, the combining section 444 refers to the combining determination table illustrated in FIG. 29, and combines the handwriting image data of the tablet 260A with the screen data because the combining implementation/non-implementation information corresponding to the terminal identification information indicating "A" indicates the implementation. On the other hand, the combining section 444 does not combine the handwriting image data of the tablet 260B with the screen data because the combining implementation/non-implementation information corresponding to the terminal identification information indicating "B" indicates the non-implementation. That is, the combining section 444 produces the combined screen data by combining only the handwriting image data of the tablet 260A with the screen data.

Figure 30:
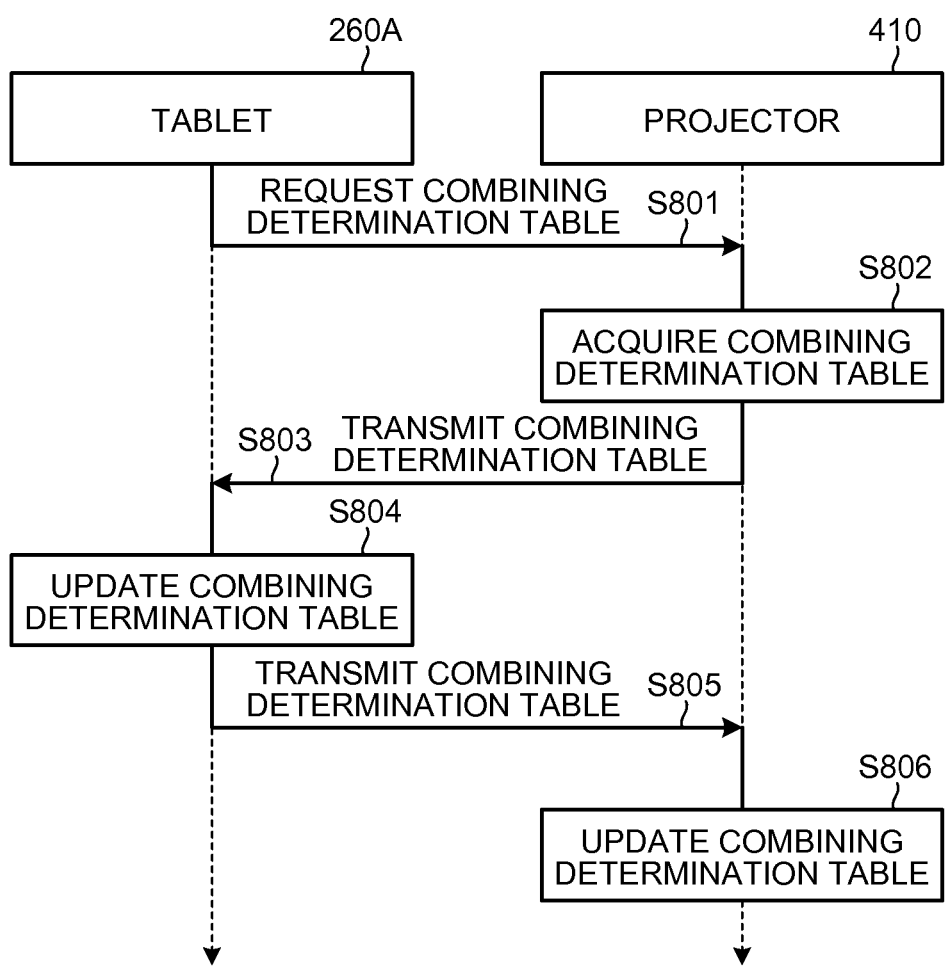
FIG. 30 is a sequence diagram illustrating an example of updating processing of the combining determination table executed by the image combining system in the fourth embodiment.

FIG. 30 is a sequence diagram illustrating an example of updating processing of the combining determination table executed by the image combining system 400 in the fourth embodiment.

The control unit 280 of the tablet 260A requests the combining determination table from the projector 410 (step S801).

The control unit 440 of the projector 410 receives the request of the combining determination table from the tablet 260A and acquires the combining determination table from the combining determination table storage section 433 (step S802), and transmits the acquired combining determination table to the tablet 260A (step S803).

The control unit 280 of the tablet 260A receives the combining determination table from the projector 410, causes the operation display unit 172 to display the received combining determination table, receives updating input from a user, and updates the content of the combining determination table (combining implementation/non-implementation information) (step S804). The control unit 280 transmits the updated combining determination table to the projector 410 (step S805).

The control unit 440 of the projector 410 receives the combining determination table from the tablet 260A and updates the combining determination table stored in the combining determination table storage section 433 on the basis of the received combining determination table (step S806).

In the example illustrated in FIG. 30, the tablet 260A updates the combining determination table. The combining determination table can be, however, updated by any of the tablets.

As described above, in the fourth embodiment, the combined screen data is produced by reflecting only the handwriting information input from the specific tablet of the handwriting information input from the tablets, and the screen based on the produced combined screen data is projected. This system is preferable for being used in meetings and lessons, for example. In addition, in the fourth embodiment, any of the tablets can switch the tablet the handwriting information of which is used for producing the combined data. This system is preferable for being used in meetings and lessons, for example.

Fifth Embodiment

In a fifth embodiment, an example is described in which a displayed screen of the tablet synchronizes with a projected screen of the projector. In the following descriptions, differences from the second embodiment are mainly described. The same name and reference numeral of the second embodiment are given to the element having the same function as the second embodiment, and description thereof is omitted.

Figures 31, 32:
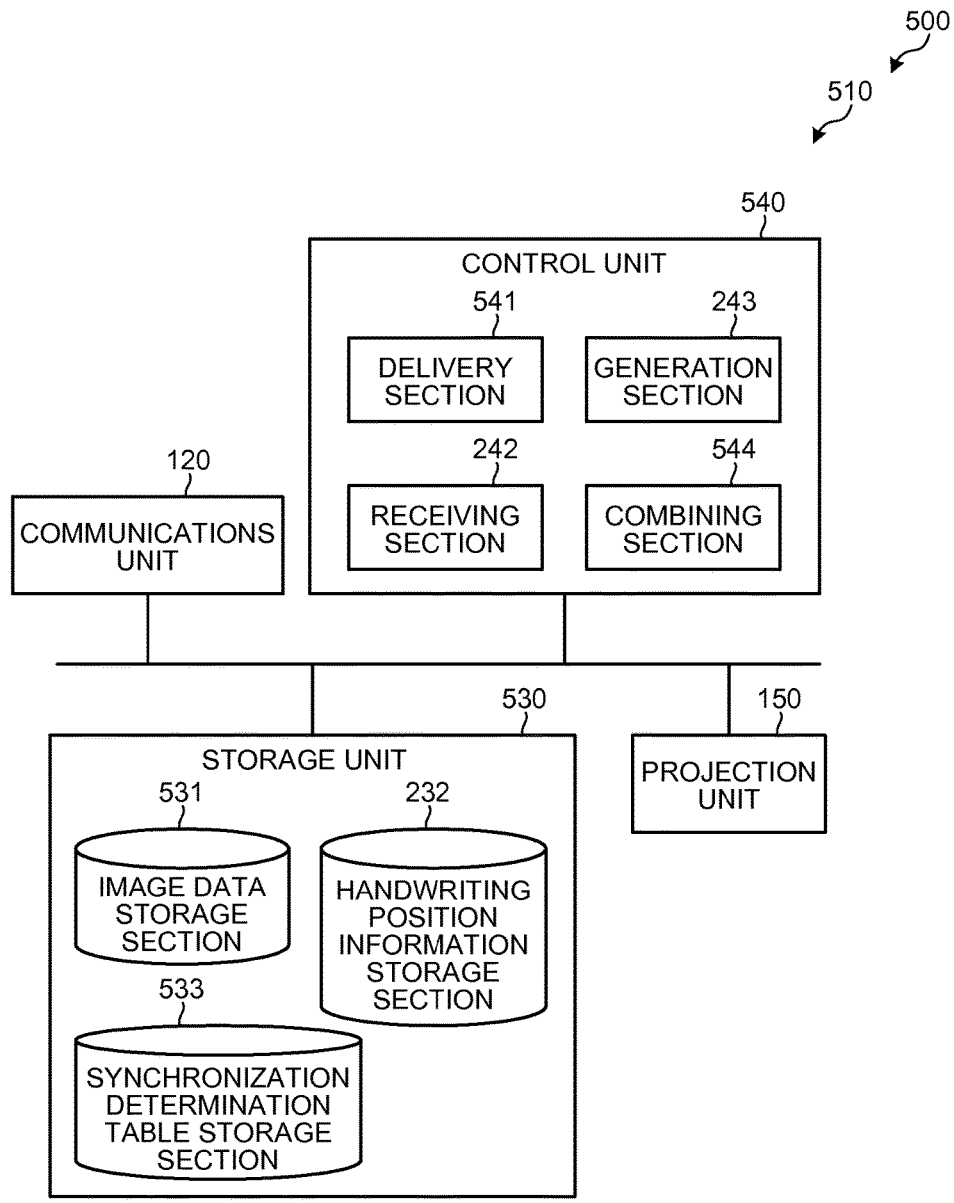
FIG. 31 is a block diagram illustrating an exemplary structure of a projector in an image combining system according to a fifth embodiment.
FIG. 32 is a schematic diagram illustrating an example of a synchronization determination table stored in a synchronization determination table storage section in the fifth embodiment.

FIG. 31 is a block diagram illustrating an exemplary structure of a projector 510 of an image combining system 500 according to the fifth embodiment. In the projector 510, a storage unit 530 including a synchronization determination table storage section 533 as an additional section and an image data storage section 531, and a control unit 540 including a delivery section 541 and a combining section 544 differ from the corresponding units and sections of the projector 210 in the second embodiment.

The synchronization determination table storage section 533 stores therein a synchronization determination table in which the terminal identification information identifying the tablet corresponds to synchronization implementation/non-implementation information indicating whether the displayed screen synchronizes with the projected screen. In the synchronization determination table, the synchronization implementation/non-implementation information indicating the non-implementation of synchronization corresponds to synchronization target terminal identification information that is the terminal identification information of the terminal device by which the handwriting information to be combined is produced.

FIG. 32 is a schematic diagram illustrating an example of the synchronization determination table stored in the synchronization determination table storage section 533 in the fifth embodiment. In the example illustrated in FIG. 32, the terminal identification information indicating "A" corresponds to the synchronization implementation/non-implementation information indicating the implementation while the terminal identification information indicating "B" corresponds to the synchronization implementation/non-implementation information indicating the non-implementation. The synchronization implementation/non-implementation information indicating the non-implementation corresponds to the synchronization target terminal identification information indicating "A" because terminal identification information indicating "B" corresponds to the synchronization implementation/non-implementation information indicating the non-implementation.

The combining section 544 produces the combined screen data. For example, the combining section 544 produces the combined screen data illustrated in FIG. 7.

In addition, the combining section 544 refers to the synchronization determination table, produces delivery combined screen data by combining the handwriting image data produced from the handwriting information of the tablet indicated by the synchronization target terminal identification information with the screen data, and stores the produced delivery combined screen data in the image data storage section 531. For example, the combining section 544 refers to the synchronization determination table illustrated in FIG. 32, and produces the delivery combined screen data illustrated in FIG. 17 by combining the handwriting image data of the tablet 260A illustrated in FIG. 16 with the screen data illustrated in FIG. 3 because the synchronization target terminal identification information corresponding to the terminal identification information indicating "B" indicates "A".

The delivery section 541 refers to the synchronization determination table, and delivers the combined screen data to the tablet corresponding to the synchronization implementation/non-implementation information indicating the implementation of synchronization out of tablets 560A and 560B. For example, the delivery section 541 refers to the synchronization determination table illustrated in FIG. 32, and delivers the combined screen data illustrated in FIG. 7 to the tablet 560A because the synchronization implementation/non-implementation information corresponding to the terminal identification information indicating "A" indicates the implementation.

The delivery section 541 refers to the synchronization determination table, and delivers the delivery combined screen data to the tablet indicated by the terminal identification information corresponding to the synchronization target terminal identification information out of the tablets 560A and 560B. For example, the delivery section 541 refers to the synchronization determination table illustrated in FIG. 32, and delivers the delivery combined screen data illustrated in FIG. 17 to the tablet 560B because the synchronization target terminal identification information corresponding to the terminal identification information indicating "B" indicates "A".

Figure 33:
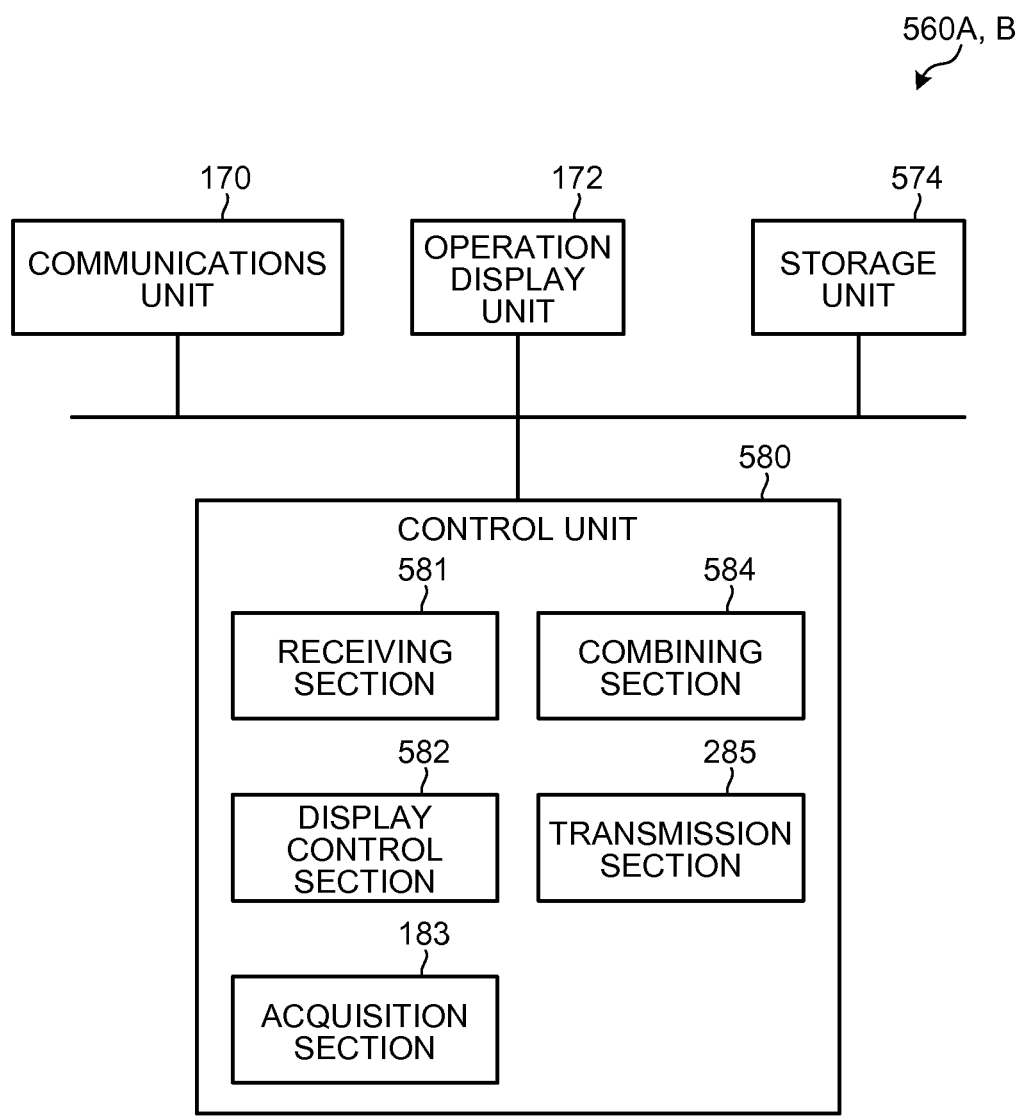
FIG. 33 is a block diagram illustrating an exemplary structure of tablets in the image combining system in the fifth embodiment.

FIG. 33 is a block diagram illustrating an exemplary structure of the tablets 560A and 560B of the image combining system 500 in the fifth embodiment. In the tablets 560A and 560B, a storage unit 574 and a control unit 580 including a receiving section 581, a display control section 582, and a combining section 584 differ from the corresponding units and sections of the projector 210 in the second embodiment.

The receiving section 581 receives the combined screen data or the delivery combined screen data from the projector 510. For example, the receiving section 581 of the tablet 560A receives the combined screen data illustrated in FIG. 7 from the projector 510 while the receiving section 581 of the tablet 560B receives the delivery combined screen data illustrated in FIG. 17 from the projector 510.

The display control section 582 causes the operation display unit 172 to display the screen based on the combined screen data or the delivery combined screen data received by the receiving section 581. For example, the display control section 582 of the tablet 560A causes the operation display unit 172 to display the screen based on the combined screen data illustrated in FIG. 7 received by the receiving section 581 while the display control section 582 of the tablet 560B causes the operation display unit 172 to display the screen based on the delivery combined screen data illustrated in FIG. 17 received by the receiving section 581.

The combining section 584 produces the combined screen data by combining the produced handwriting image data with the combined screen data or the delivery combined screen data received by the receiving section 581.

Figure 34:
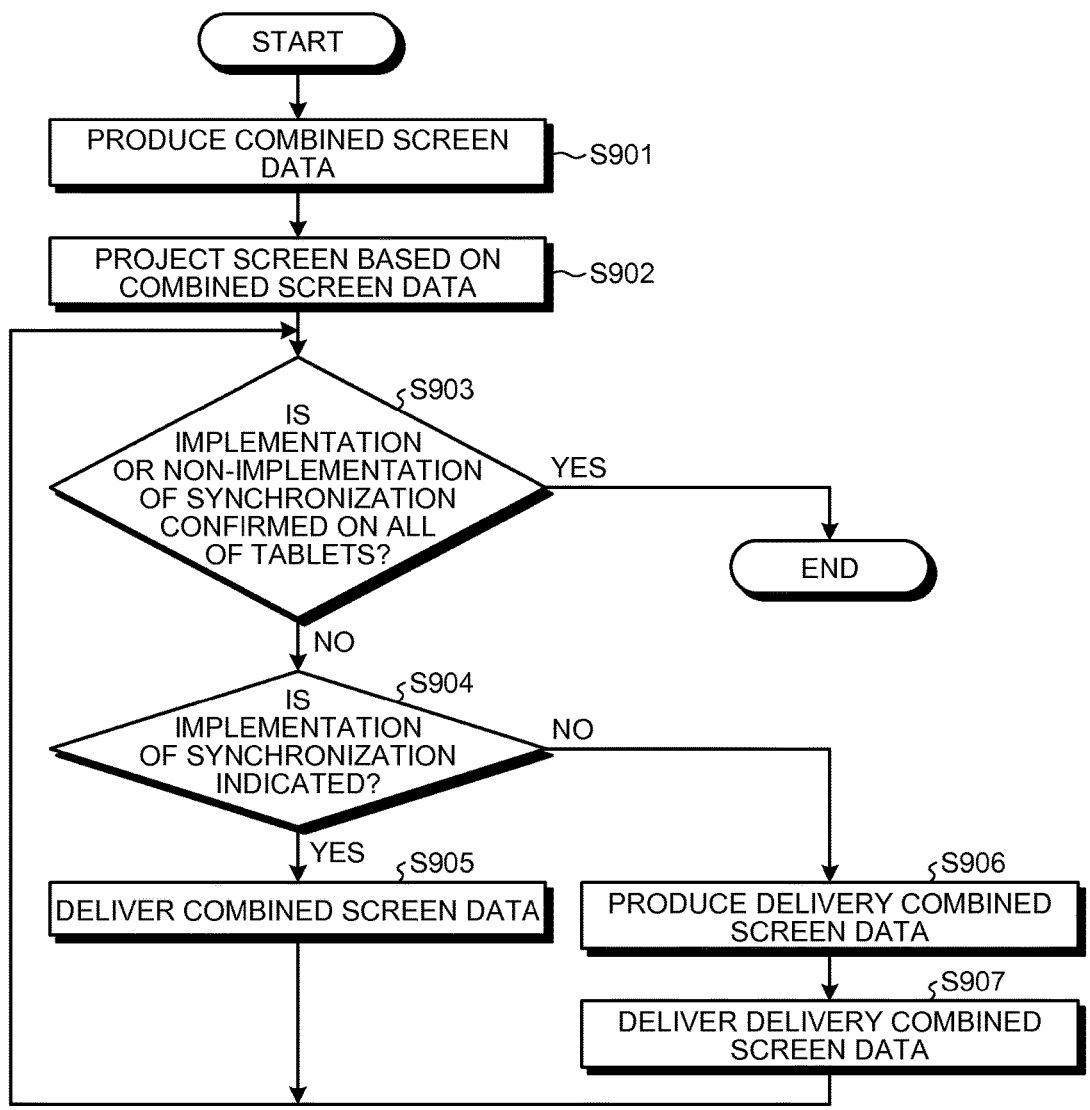
FIG. 34 is a flowchart illustrating an example of delivery processing executed by the projector in the fifth embodiment.

FIG. 34 is a flowchart illustrating an example of delivery processing executed by the projector 510 in the fifth embodiment.

The processing performed at step S901 and step S902 is the same as that performed at step S404 and step S405 of the flowchart in FIG. 13.

If the confirmation of the implementation or the non-implementation of synchronization is not completed for all of the tablets in the synchronization determination table (No at step S903), the combining section 544 confirms whether the synchronization implementation/non-implementation information corresponding to the terminal identification information of the unconfirmed terminal indicates the implementation (step S904). If the confirmation of the implementation or the non-implementation of synchronization is completed for all of the tablets in the synchronization determination table (Yes at step S903), the processing ends.

If the synchronization implementation/non-implementation information indicates the implementation (Yes at step S904), the delivery section 541 delivers the combined screen data to the tablet indicated by the terminal identification information corresponding to the synchronization implementation/non-implementation information (step S905), and then the processing returns to step S903.

On the other hand, if the synchronization implementation/non-implementation information indicates the non-implementation (No at step S904), the combining section 544 produces the delivery combined screen data by combining the handwriting image data of the tablet indicated by the synchronization target terminal identification information corresponding to the synchronization implementation/non-implementation information indicating the non-implementation with the screen data (step S906), and the delivery section 541 delivers the delivery combined screen data to the tablet indicated by the synchronization implementation/non-implementation information indicating the non-implementation (step S907), and the processing returns to step S903.

Figure 35:
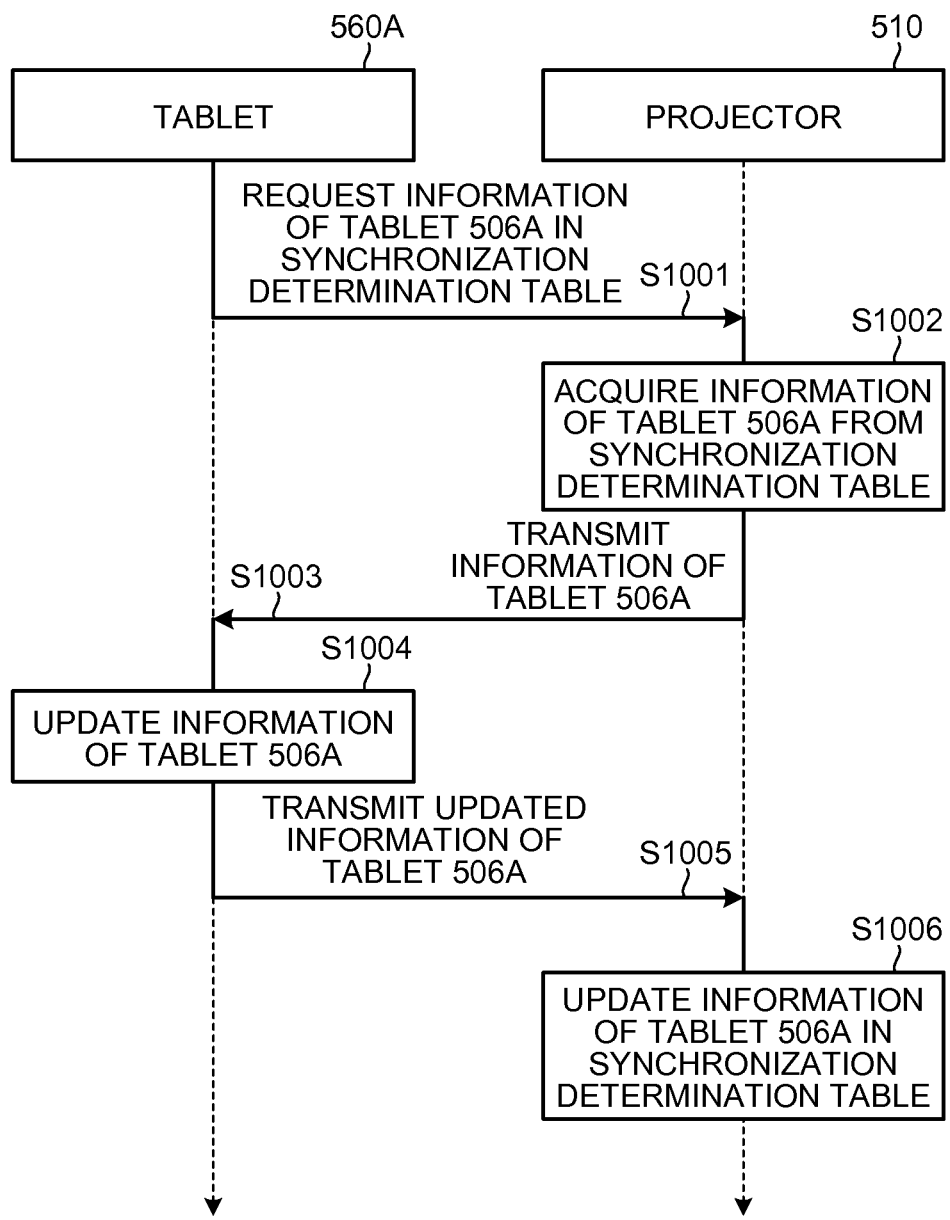
FIG. 35 is a sequence diagram illustrating an example of the updating processing of the synchronization determination table executed by an image combining system 500 in the fifth embodiment.

FIG. 35 is a sequence diagram illustrating an example of the updating processing of the synchronization determination table executed by the image combining system 500 in the fifth embodiment.

The control unit 580 of the tablet 560A requests the information of the tablet itself (the tablet 560A) in the synchronization determination table from the projector 510 (step S1001).

The control unit 540 of the projector 510 receives the request from the tablet 560A and acquires the information of the tablet 560A in the synchronization determination table from the synchronization determination table storage section 533 (step S1002), and transmits the acquired information to the tablet 560A (step S1003).

The control unit 580 of the tablet 560A receives the information of the tablet 560A from the projector 510, causes the operation display unit 172 to display the received information of the tablet 560A, receives updating input from a user, and updates the content of the information of the tablet 560A (the synchronization implementation/non-implementation information, the synchronization target terminal identification information) (step S1004). The control unit 580 transmits the updated information of the tablet 560A to the projector 510 (step S1005).

The control unit 540 of the projector 510 receives the updated information of the tablet 560A from the tablet 560A, and updates the information of the tablet 560A in the synchronization determination table on the basis of the received information of the tablet 560A (step S1006).

In the example illustrated in FIG. 35, the tablet 560A updates the own information in the synchronization determination table. The own information in the synchronization determination table can be, however, updated by any of the tablets.

As described above, the fifth embodiment enables the displayed screen of the tablet to synchronize with the projected screen of the projector. This system is preferable for being used in meetings and lessons, for example. In addition, the fifth embodiment enables the displayed screen of the tablet to be the screen combined with the handwriting information of any of the tablets. This system is preferable for being used in meetings and lessons, for example.

Fourth Modification

Being not limited to the above-described embodiments, various modifications may be made. For example, the first to the third modifications and the second to the fifth embodiments may be combined with in various combinations.

Hardware Structure

The projector in each embodiment and modification has a hardware configuration utilizing a normal computer. Specifically, the projector includes the control device such as the CPU, the storage device such as the ROM or the RAM, the external storage device such as the HDD or the removable drive, the projection device, and the communications device such as the communications interface.

The tablet in each embodiment and modification has a hardware configuration utilizing a normal computer. Specifically, the projector includes the control device such as the CPU, the storage device such as the ROM or the RAM, the external storage device such as the HDD or the removable drive, the display device such as the display, an input device such as a keyboard or a mouse, and the communications device such as the communications interface.

The programs executed by the projector and the tablet in each embodiment and modification are stored in a computer-readable recording medium in a format installable in or a file having a format executable by the projector and the tablet, and provided. Examples of the computer-readable recording media include CD-ROMs, CD-Rs, memory cards, digital versatile disks (DVDs) and flexible disks (FDs).

The programs executed by the projector and the tablet in each embodiment and modification may be stored in a computer connected to a network such as the Internet, and may be provided by downloading the programs through the network. The programs executed by the projector and the tablet in each embodiment and modification may be provided or delivered through a network such as the Internet. The programs executed by the projector and the tablet in each embodiment and modification may be provided with a ROM, for example, into which the programs have been written.

The programs executed by the projector and the tablet in each embodiment and modification have a module structure for realizing each unit and section described above in a computer. In practical hardware, the CPU reads out the program from the HDD to the RAM so as to execute the program, so that each unit and section described above can be realized in the computer.

The embodiment provides advantage of reducing the load of the network.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image combining apparatus coupled to a first terminal device remote from the image combining apparatus through a network, the image combining apparatus comprising:

a control unit configured to deliver screen data that is image data for a screen to the first terminal device;

receive and store a first coordinate as handwriting position information indicating a first position of handwriting information input to a screen of the first terminal device based on the screen data on the first terminal device;

sequentially receive a second coordinate as a current coordinate of the handwriting position information indicating a second position of handwriting information input to the screen of the first terminal device based on the screen data on the first terminal device, with the first coordinate;

determine that the first coordinate is equal to a coordinate previously received and stored;

store the current coordinate;

produce handwriting image data that is the image data of the received handwriting information using the current coordinate of the handwriting position information each time handwriting position information is received;

produce combined screen data by combining the screen data with the produced handwriting image data; and project a screen generated by the image combining apparatus using the combined screen data based on the handwriting information in real time.

2. The image combining apparatus according to claim 1, wherein the control unit receives first deletion position information indicating a position of a part to be deleted from the handwriting information, and produces the handwriting image data further using the first deletion position information.

3. The image combining apparatus according to claim 1, wherein the image combining apparatus is further coupled to a second terminal device through the network, and the control unit is further configured to deliver the screen data to the second terminal device, receive second handwriting position information indicating a position of second handwriting information input to a screen based on the screen data on the second terminal device, produce second handwriting image data that is the image data of the second handwriting information using the second handwriting position information, and produce the combined screen data by further combining the second handwriting image data.

4. The image combining apparatus according to claim 3, further comprising a memory that includes a combination color table storage section that stores therein a combination color table in which terminal identification information identifying a terminal device corresponds to color information indicating a color used for coloring the handwriting image data, wherein the control unit is further configured to receive first terminal identification information that is the terminal identification information of the first terminal device together with the handwriting position information, and second terminal identification information that is the terminal identification information of the second terminal device together with the second handwriting position information, and refer to the combination color table, and combine the handwriting image data in the color indicated by the color information corresponding to the first terminal identification information with the screen data, and the second handwriting image data in the color indicated by the color information corresponding to the second terminal identification information with the screen data.

5. The image combining apparatus according to claim 3, further comprising:

a projector that projects the screen based on the screen data and projects a screen based on the combined screen data when the combined screen data is produced; and a memory that includes a synchronization determination table storage section that stores therein a synchronization determination table in which terminal identification information identifying a terminal device corresponds to synchronization implementation/non-implementation information indicating implementation or non-implementation of synchronization with a projected screen, wherein the control unit refers to the synchronization determination table and delivers the combined screen data to the terminal device corresponding to the synchronization implementation/non-implementation information indicating the implementation of synchronization out of the first terminal device and the second terminal device.

6. The image combining apparatus according to claim 5, wherein in the synchronization determination table, the synchronization implementation/non-implementation information indicating the non-implementation of synchronization corresponds to synchronization target terminal identification information that is the terminal identification information of a terminal device by which handwriting information to be combined is produced, the control unit refers to the synchronization determination table and produces delivery combined screen data by combining the handwriting image data produced from the handwriting information of the terminal device indicated by the synchronization target terminal identification information with the screen data, and refers to the synchronization determination table and delivers the delivery combined screen data to the terminal device indicated by the terminal identification information corresponding to the synchronization target terminal identification information out of the first terminal device and the second terminal device.

7. The image combining apparatus according to claim 3, further comprising a memory that includes a combining determination table storage section that stores therein a combining determination table in which terminal identification information identifying a terminal device corresponds to combining implementation/non-implementation information indicating implementation or non-implementation of combining of the handwriting image data, wherein the control unit is further configured to receive first terminal identification information that is the terminal identification information of the first terminal device together with the handwriting position information, and second terminal identification information that is the terminal identification information of the second terminal device together with the second handwriting position information, and the control unit refers to the combining determination table, and combines the handwriting image data with the screen data when the combining implementation/non-implementation information corresponding to the first terminal identification information indicates the implementation of combining, and combines the second handwriting image data with the screen data when the combining implementation/non-implementation information corresponding to the second terminal identification information indicates the implementation of combining.

8. The image combining apparatus according to claim 1, further comprising a projector that
projects the screen based on the screen data and
projects a screen based on the combined screen data when the combined screen data is produced.

9. The image combining apparatus according to claim 1, further comprising
a memory including a handwriting position information storage section that stores therein first handwriting position information and input time information indicating input time of the first handwriting information so as to correspond to each other, wherein the control unit is further configured to
receive time designation information designating input time of a part to be reproduced of the first handwriting information, and
acquire, from the handwriting position information storage section, the handwriting position information of the part corresponding to the input time designated by the time designation information of the first handwriting position information, and
produce handwriting image data of the part to be reproduced of the first handwriting information using the handwriting position information.

10. A terminal device coupled to an image combining apparatus, remote from the terminal device, through a network, the terminal device comprising:
a control unit configured to
receive screen data that is image data for a screen from the image combining apparatus;
cause display on a screen of the terminal device based on the screen data;
receive user input of handwriting information input to the screen of the terminal device and acquire handwriting position information indicating a position of the handwriting information as coordinate pairs each time a piece of handwriting position information is input to the screen of the first terminal device;
transmit a piece of handwriting position information is input to the screen of the first terminal device as a first coordinate representing a first handwriting position input by the user to the image combining apparatus
transmit, sequentially to the image combining apparatus the first coordinate, another piece of handwriting position information, as a second coordinate, representing a current handwriting position input by the user.

11. The terminal device according to claim 10, wherein the control unit is further configured to
magnify or reduce the screen at a magnification/reduction rate set by magnification/reduction operation and cause the display unit to display the resulting screen,
magnify or reduce the acquired handwriting position information at an inverse of the magnification/reduction rate, and
transmit the magnified or reduced handwriting position information to the image combining apparatus.

12. An image combining system comprising:
a terminal device; and
an image combining apparatus remote from and coupled to the terminal device through a network, wherein the terminal device includes:
a control unit configured to
receive screen data that is image data for a screen from the image combining apparatus;
cause a display unit to display a screen based on the screen data;
receive input of handwriting information to the screen and acquire handwriting position information indicating a position of the handwriting information each time a piece of handwriting information is input to a screen of the terminal device; and
transmit the acquired handwriting position information to the image combining apparatus each time a piece of handwriting information is input to a screen of the terminal device, and
the image combining apparatus includes:
a control unit configured to
deliver the screen data to the terminal device;
receive and store a first coordinate as the handwriting position information indicating a first position of handwriting information input to the terminal device;
receive a second coordinate as current coordinate of the handwriting position information indicating a second position of handwriting information input to the screen of the first terminal device based on the screen data on the first terminal device, with the first coordinate;
determine that the first coordinate is equal to a coordinate previously received and stored;
store the current coordinate;
produce handwriting image data that is the image data of the handwriting information using the received handwriting position information each time a piece of handwriting position information is received from the terminal device;
produce combined screen data by combining the screen data with the produced handwriting image data; and
project a screen generated by the image combining apparatus using the combined screen data based on the handwriting information in real time.

13. The image combining system according to claim 12, wherein in the image combining apparatus,
the control unit is further configured to receive first deletion position information indicating a position of a part to be deleted from the handwriting information, and
produce the handwriting image data further using the first deletion position information.

14. The image combining system according to claim 12, wherein the image combining apparatus further comprises
a memory that includes a handwriting position information storage section that stores therein the handwriting position information and input time information indicating input time of the handwriting information so as to correspond to each other, wherein in the image combining apparatus,
the control unit is further configured to receive time designation information designating input time of a part to be reproduced of the handwriting information, and
acquire, from the handwriting position information storage section, the handwriting position information of the part corresponding to the input time designated by the time designation information of the handwriting position information, and
produce handwriting image data of the part to be reproduced of the handwriting information using the handwriting position information.

15. The image combining system according to claim 12, wherein
the image combining apparatus is further coupled to a second terminal device through the network,
in the image combining apparatus,
the control unit is further configured to deliver the screen data to the second terminal device,
receive second handwriting position information indicating a position of second handwriting information input to a screen based on the screen data on the second terminal device,
produce second handwriting image data that is the image data of the second handwriting information using the second handwriting position information, and
produce the combined screen data by further combining the second handwriting image data.

16. The image combining system according to claim 15, further comprising
a memory that includes a combination color table storage section that stores therein a combination color table in which terminal identification information identifying a terminal device corresponds to color information indicating a color used for coloring the handwriting image data, wherein
in the image combining apparatus,
the control unit is further configured to receive
first terminal identification information that is the terminal identification information of the first terminal device together with the handwriting position information, and
second terminal identification information that is the terminal identification information of the second terminal device together with the second handwriting position information, and
refer to the combination color table, and
combine
the handwriting image data in the color indicated by the color information corresponding to the first terminal identification information with the screen data, and
the second handwriting image data in the color indicated by the color information corresponding to the second terminal identification information with the screen data.

17. The image combining system according to claim 15, wherein
the image combing apparatus further comprises
a projector that
projects the screen based on the screen data and projects a screen based on the combined screen data when the combined screen data is produced; and
a memory that includes a synchronization determination table storage section that stores therein a synchronization determination table in which the terminal identification information identifying a terminal device corresponds to synchronization implementation/non-implementation information indicating implementation or non-implementation of synchronization with a projected screen, wherein
the control unit
refers to the synchronization determination table and delivers the combined screen data to the terminal device corresponding to the synchronization implementation/non-implementation information indicating the implementation of synchronization out of the first terminal device and the second terminal device.

18. The image combining system according to claim 15, wherein the image combining apparatus further comprises a combining determination table storage section that stores therein a combining determination table in which terminal identification information identifying a terminal device corresponds to combining implementation/non-implementation information indicating implementation or non-implementation of combining of the handwriting image data,
in the image combining apparatus,
the receiving section receives
first terminal identification information that is the terminal identification information of the first terminal device together with the handwriting position information, and
second terminal identification information that is the terminal identification information of the second terminal device together with the second handwriting position information, and
the combining section
refers to the combining determination table,
combines the handwriting image data with the screen data when the combining implementation/non-implementation information corresponding to the first terminal identification information indicates the implementation of combining, and
combines the second handwriting image data with the screen data when the combining implementation/non-implementation information corresponding to the second terminal identification information indicates the implementation of combining.

19. The image combining system according to claim 12, wherein
the image combing apparatus further comprises a projector that
projects the screen based on the screen data and
projects a screen based on the combined screen data when the combined screen data is produced.

20. The image combining system according to claim 12, wherein
in the terminal device,
the control unit
magnifies or reduces the screen at a magnification/reduction rate set by magnification/reduction operation and
causes the display unit to display the resulting screen,
magnifies or reduces the acquired handwriting position information at an inverse of the magnification/reduction rate, and
transmits the magnified or reduced handwriting position information to the image combining apparatus.

21. The image combining system according to claim 12, further comprising a memory including a handwriting position information storage section that stores therein first handwriting position information and input time information indicating input time of the first handwriting information so as to correspond to each other, wherein
the control unit is further configured to receive time designation information designating input time of a part to be reproduced of the first handwriting information, and
acquire, from the handwriting position information storage section, the handwriting position information of the part corresponding to the input time designated by the time designation information of the first handwriting position information, and produce handwriting image data of the part to be reproduced of the first handwriting information using the handwriting position information.

* * * * *